(12) United States Patent
Skaja et al.

(10) Patent No.: US 7,178,267 B2
(45) Date of Patent: Feb. 20, 2007

(54) METHOD FOR FORMING FOOTWEAR STRUCTURES USING THERMOFORMING

(75) Inventors: Joseph Skaja, Thousand Oaks, CA (US); Kenneth J. Liu, Westlake Village, CA (US); David Joseph Preskar, Westlake Village, CA (US); Steven B. Nichols, Los Angeles, CA (US)

(73) Assignee: Polyworks, Inc., Lincoln, RI (US)

( * ) Notice: Subject to any disclaimer, the term of this patent is extended or adjusted under 35 U.S.C. 154(b) by 0 days.

(21) Appl. No.: 10/733,268

(22) Filed: Dec. 12, 2003

(65) Prior Publication Data

US 2005/0126038 A1 Jun. 16, 2005

(51) Int. Cl.
A43B 13/18 (2006.01)
(52) U.S. Cl. .................. 36/25 R; 36/30 R; 36/31; 36/114
(58) Field of Classification Search ............... 36/28, 36/29, 25 R, 30 R, 31, 35 B, 114, 35 R
See application file for complete search history.

(56) References Cited

U.S. PATENT DOCUMENTS

| | | | |
|---|---|---|---|
| 3,251,727 A | 5/1966 | Reynolds et al. | |
| 3,629,050 A | 12/1971 | Weinstein | |
| 3,642,563 A | 2/1972 | Davis et al. | |
| 3,720,971 A | 3/1973 | Wyness et al. | |
| 4,034,431 A | 7/1977 | Fukuoka | |
| 4,223,455 A | 9/1980 | Vermeulen | |
| 4,430,811 A | 2/1984 | Okada | |
| 4,433,494 A | 2/1984 | Courvoisier et al. | |
| 4,494,321 A | 1/1985 | Lawlor | |
| 4,504,276 A | 3/1985 | Baker | |
| 4,508,582 A | 4/1985 | Fink | |
| 4,547,906 A | 10/1985 | Nishida et al. | |
| 4,583,247 A | 4/1986 | Fingerhut et al. | |
| 4,635,384 A | 1/1987 | Huh et al. | |
| 4,651,444 A | 3/1987 | Ours | |
| 4,743,488 A | 5/1988 | Jones et al. | |
| 4,778,717 A | 10/1988 | Fitchmun | |

(Continued)

FOREIGN PATENT DOCUMENTS

DE 004032934 A1 4/1992

(Continued)

Primary Examiner—Marie Patterson
(74) Attorney, Agent, or Firm—Doherty, Wallace, Pillsbury & Murphy, P.C.

(57) ABSTRACT

Footwear and footwear structures are provided as well as methods for forming composite components for footwear or footwear structures. In forming the structures, two material layers are overlaid such that the two material layers are in contact with one another. The two material layers are heated to a forming temperature and are then vacuum-formed together to form a composite material layer in a three-dimensional form of the footwear structure. A provided footwear structure includes an upper and a sole assembly attached to the upper. The sole assembly includes a first material layer made of a thermoplastic, and a second material layer attached to the first material layer. The first material layer includes a recessed area including a flat support portion, and is transparent or translucent. The second material layer includes a portion that is positioned on a surface of the recessed area, and a color of the second material layer indicates a location and/or a function of the second material layer.

46 Claims, 17 Drawing Sheets

U.S. PATENT DOCUMENTS

| | | | |
|---|---|---|---|
| 4,823,483 A | 4/1989 | Chapnick | |
| 4,838,693 A | 6/1989 | Uchida | |
| 4,858,339 A | 8/1989 | Hayafuchi et al. | |
| 4,892,780 A | 1/1990 | Cochran et al. | |
| 4,999,931 A | 3/1991 | Vermeulen | |
| 5,005,299 A * | 4/1991 | Whatley | 36/25 R |
| 5,106,445 A | 4/1992 | Fukuoka | |
| 5,123,180 A | 6/1992 | Nannig et al. | |
| 5,134,017 A | 7/1992 | Baldwin et al. | |
| 5,224,278 A | 7/1993 | Jeon | |
| 5,338,600 A | 8/1994 | Fitchmun et al. | |
| 5,354,604 A | 10/1994 | Blakeman et al. | |
| 5,388,349 A | 2/1995 | Ogden | |
| 5,390,430 A | 2/1995 | Fitchmun et al. | |
| 5,401,564 A | 3/1995 | Lee et al. | |
| 5,462,295 A | 10/1995 | Seltzer | |
| 5,503,879 A | 4/1996 | Cochran | |
| 5,525,412 A | 6/1996 | Blakeman et al. | |
| 5,529,826 A | 6/1996 | Tailor et al. | |
| 5,560,985 A | 10/1996 | Watanabe et al. | |
| 5,571,607 A | 11/1996 | Blakeman et al. | |
| 5,572,804 A | 11/1996 | Skaja et al. | |
| 5,625,963 A * | 5/1997 | Miller et al. | 36/28 |
| 5,653,046 A | 8/1997 | Lawlor | |
| 5,727,336 A | 3/1998 | Ogden | |
| 5,738,937 A | 4/1998 | Baychar | |
| 5,785,909 A | 7/1998 | Chang et al. | |
| 5,843,851 A | 12/1998 | Cochran | |
| 5,874,133 A | 2/1999 | Cochran | |
| 5,896,680 A * | 4/1999 | Kim et al. | 36/28 |
| 5,933,983 A | 8/1999 | Jeon | |
| 5,940,991 A | 8/1999 | Cabalquinto | |
| 5,976,451 A | 11/1999 | Skaja et al. | |
| 6,007,748 A | 12/1999 | Krajcir | |
| 6,012,236 A | 1/2000 | Pozzobon | |
| 6,029,962 A | 2/2000 | Shorten et al. | |
| 6,060,409 A | 5/2000 | Cochran | |
| 6,098,313 A | 8/2000 | Skaja | |
| 6,156,403 A | 12/2000 | Cochran | |
| 6,195,917 B1 | 3/2001 | Dieckhaus | |
| 6,266,897 B1 * | 7/2001 | Seydel et al. | 36/29 |
| 6,338,205 B2 | 1/2002 | Mitchell | |
| 6,346,319 B1 | 2/2002 | Cochran | |
| 6,361,730 B1 | 3/2002 | Alex et al. | |
| 6,367,167 B1 | 4/2002 | Krstic et al. | |
| 6,670,029 B2 | 12/2003 | Norton et al. | |
| 6,918,198 B2 * | 7/2005 | Chi | 36/29 |
| 2001/0001351 A1 | 5/2001 | Dieckhaus | |
| 2001/0005945 A1 | 7/2001 | Mitchell | |
| 2001/0009830 A1 | 7/2001 | Baychair | |
| 2001/0032399 A1 | 10/2001 | Lichfield et al. | |
| 2002/0012784 A1 | 1/2002 | Norton et al. | |
| 2002/0022428 A1 | 2/2002 | Parker et al. | |
| 2002/0050077 A1 | 5/2002 | Skaja | |
| 2002/0071946 A1 | 6/2002 | Norton et al. | |
| 2002/0088145 A1 * | 7/2002 | Clark et al. | 36/97 |
| 2002/0119276 A1 | 8/2002 | Skaja | |
| 2002/0144429 A1 * | 10/2002 | Hay | 36/25 R |
| 2004/0194343 A1 * | 10/2004 | Kim | 36/29 |
| 2004/0211088 A1 * | 10/2004 | Volkart | 36/28 |

FOREIGN PATENT DOCUMENTS

| | | |
|---|---|---|
| DE | 0614623 A1 | 9/1994 |
| DE | 019547276 A1 | 6/1997 |
| EP | 0 202 884 A2 | 11/1986 |
| EP | 0 507 322 A2 | 10/1992 |
| EP | 0 916 277 A1 | 5/1999 |
| FR | 002748965 A1 | 11/1997 |
| JP | 403191902 A | 8/1991 |
| JP | 403247303 | 11/1991 |
| JP | 405147146 A | 6/1993 |
| JP | 406245804 A | 9/1994 |
| JP | 407308203 A | 11/1995 |
| JP | 408242906 A | 9/1996 |
| JP | 409010011 A | 1/1997 |
| JP | 409158056 A | 6/1997 |
| JP | 409309171 A | 11/1997 |
| JP | 410099103 A | 4/1998 |
| WO | WO 93/05675 A1 | 4/1993 |
| WO | WO 99/22160 A1 | 4/1993 |
| WO | WO 94/24896 A1 | 11/1994 |
| WO | WO 00/51458 A1 | 9/2000 |

* cited by examiner

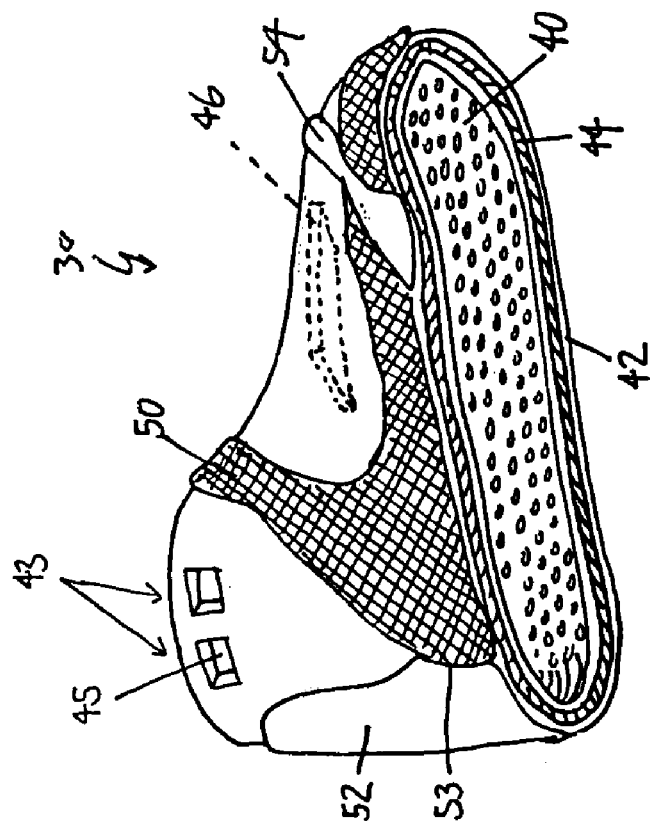
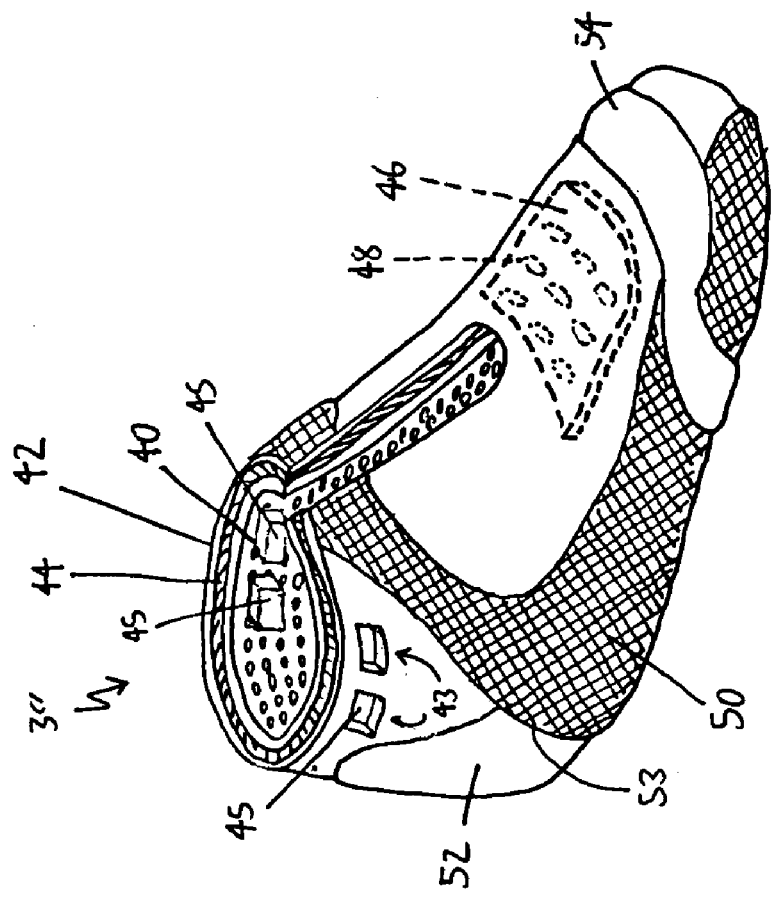

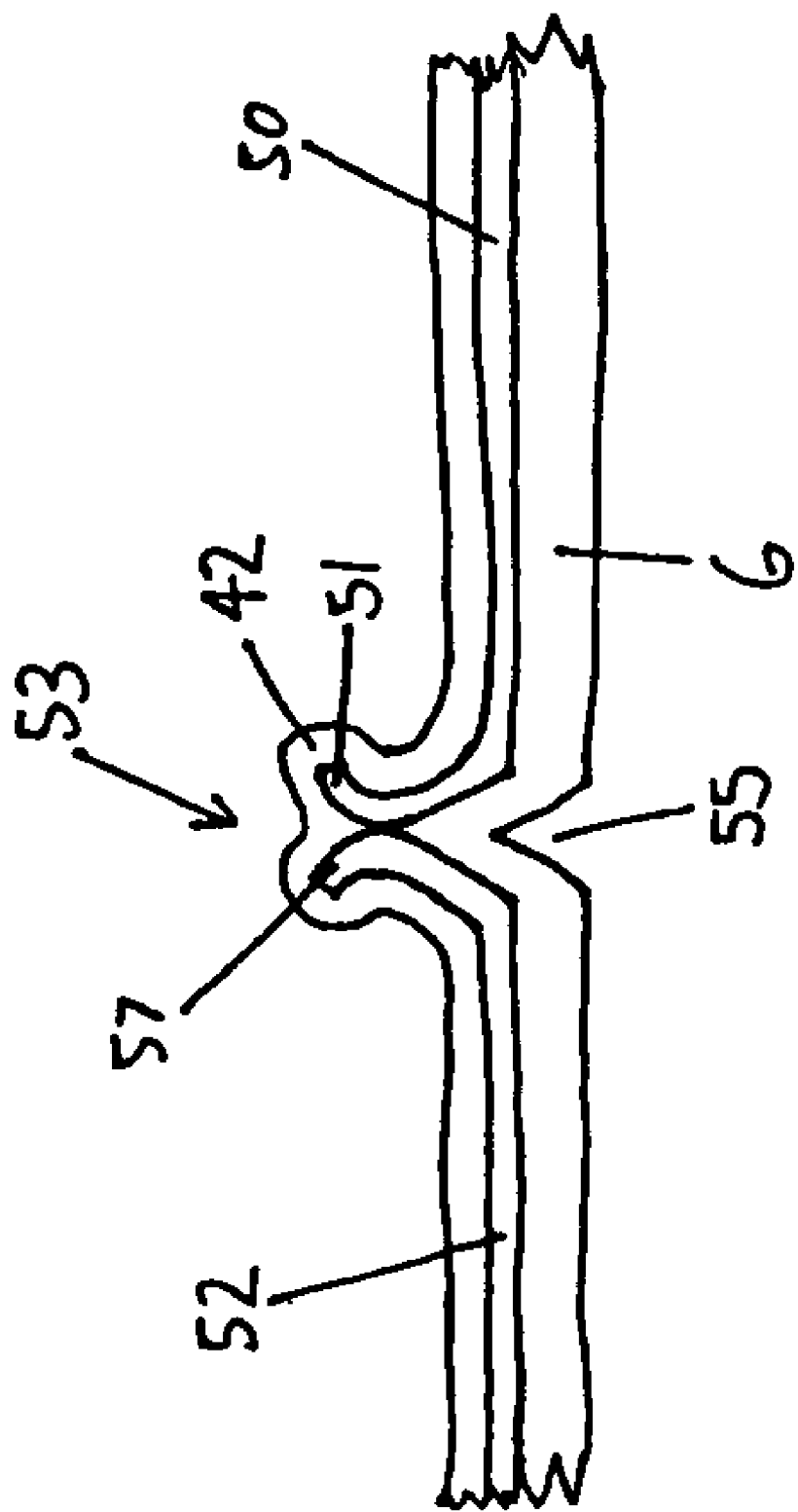

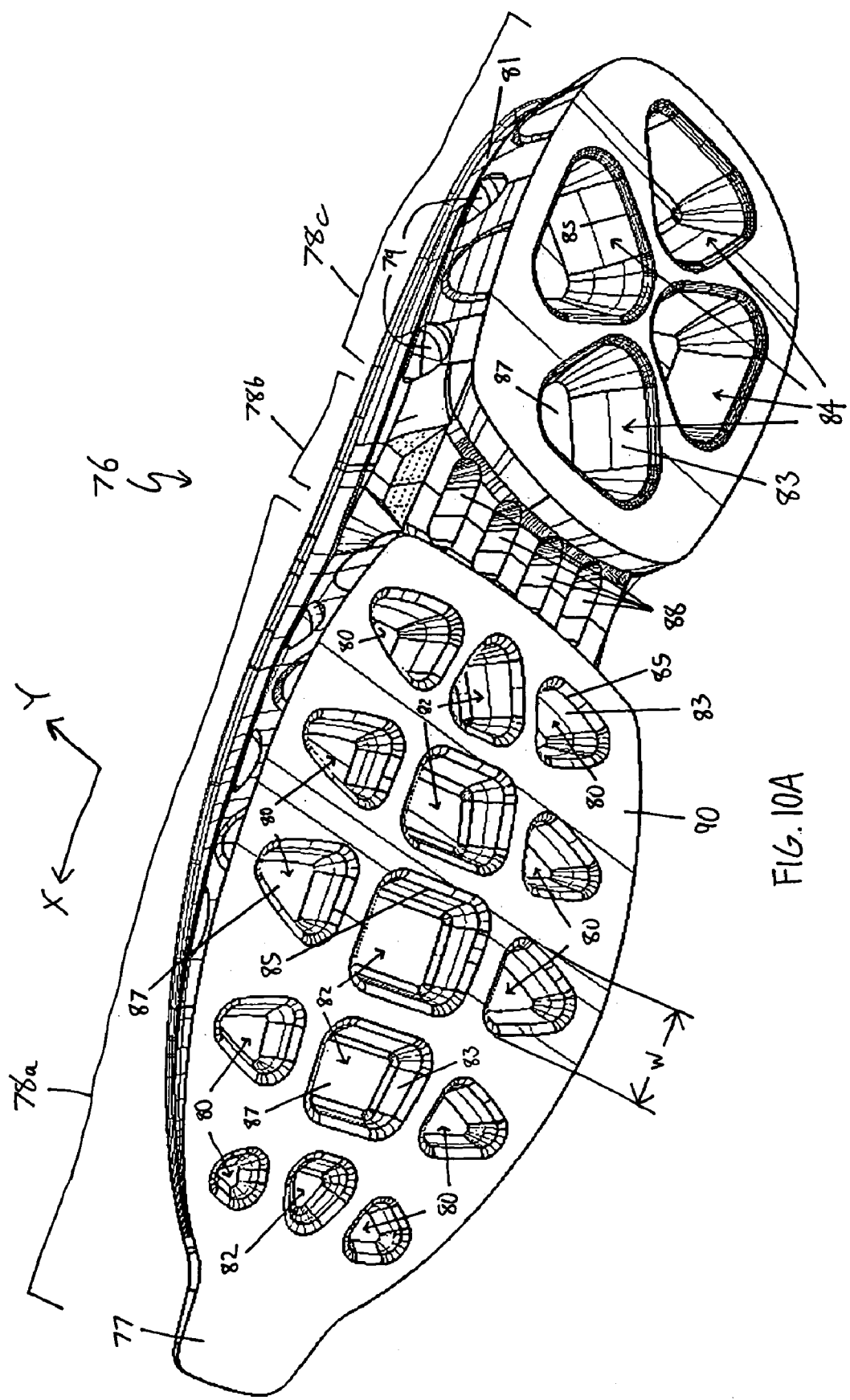

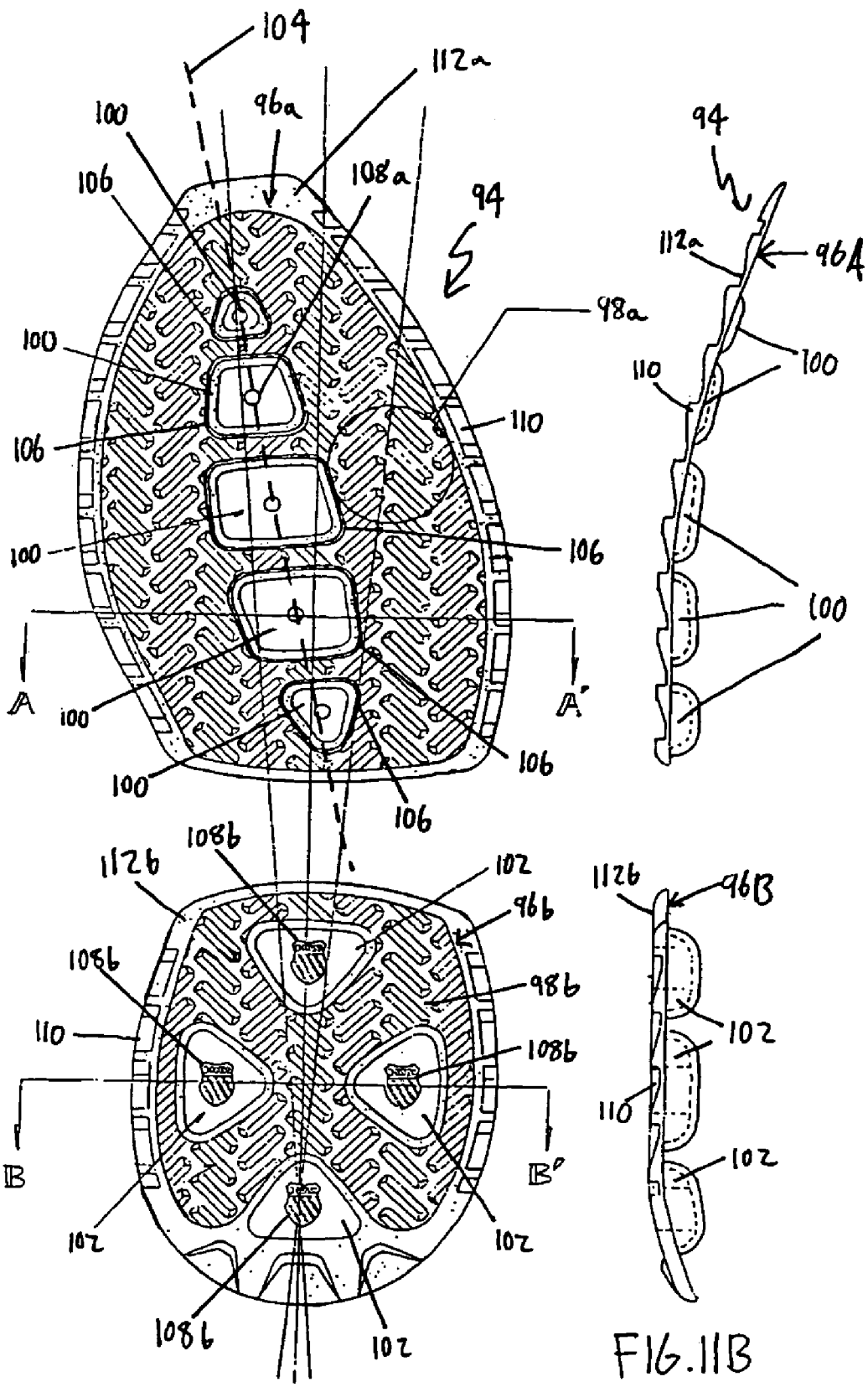

A-A'

B-B'

METHOD FOR FORMING FOOTWEAR STRUCTURES USING THERMOFORMING

BACKGROUND OF THE INVENTION

1. Field of the Invention

The present invention generally relates to footwear, more particularly, to footwear structures and manufacturing methods for forming footwear structures by thermoforming one or more layers of material.

2. Discussion of the Background

A typical athletic shoe includes an upper, a midsole, and an outsole. The upper covers and protects the instep, heel, and side portions of the foot and is commonly constructed of leather or other natural or synthetic materials (e.g., nylon). The particular sport for which the athletic shoe is to be utilized often dictates the material or materials used to construct the upper. For example, for the upper of a basketball shoe, it is often desirable to utilize a heavy material such as leather because leather provides more support to the wearer's foot and ankle than canvas or nylon. A running shoe upper, however, might be formed almost entirely of a synthetic material because such a material is relatively lightweight, breathable, and easy to clean. However, a wide variety of materials or combinations of materials might be selected for a particular shoe design based upon factors such as cost, current styles and trends, and the ability to obtain the desired performance requirements with certain materials.

The midsole lies between the upper and the outsole and is provided mainly to cushion the heel and forefoot of the wearer. Synthetic materials such as polyurethane (PU), ethyl vinyl acetate (EVA), and polyester ethyl vinyl acetate (PE-EVA) are commonly used to form the midsole. The midsole can be formed in one or more pieces and can also include a wedge or cushioning insert disposed beneath the heel of the wearer to effectively increase the amount of cushioning. During assembly, the midsole is typically bonded, either by cement or by fusion, to an inner sole assembly (or "sockliner") of the shoe.

The outsole comes into direct contact with the ground and is commonly molded from an abrasive-resistant material, such as rubber. To provide traction to the wearer, the outsole includes geometries of protrusions and recessions designed to increase friction between the outsole and the contacting ground. Such geometries are chosen based on the particular activities that the shoe is intended to be used for. The outsole is bonded or adhered to the bottom surface of the midsole to complete the shoe unit. It can be difficult to precisely define the terms sole and midsole, because the terms are not always used uniformly, and the same or similar components could be considered as part of a sole or as part of a midsole. For example, sometimes the term "sole" is used to encompass both sole and midsole components. As used herein, the term "sole" refers to the outermost portion or layer of the shoe which contacts the ground in use, while "midsole" refers to a layer or layers above the sole. The term "sole assembly" is used generically to refer to one or more sole and/or midsole components, and thus, a sole assembly might or might not include a sole or a midsole. Thus a "sole assembly" could include only midsole components, only sole components, or both sole and midsole components. Where the "sole assembly" as used in the specification and appended claims is intended to specifically include certain components, specific reference is made thereto.

A current process for molding an upper involves backing a composite plastic component with a foam material and then pressure-forming the plastic and the foam into a desired shape using heat and high pressure. A variation of this foam-backing process involves pre-assembling layers of materials and then forming the assembled layer into a finished component.

A known process for manufacturing sole assemblies involves a twin-sheet thermoforming process, as described in U.S. Pat. No. 5,976,451 to Skaja et al., the disclosure of which is hereby incorporated by reference in its entirety. In this process, a single footwear structure is formed by the combination of two separate material layers, which are separately thermoformed on respective non-mating molds and subsequently attached.

The process of twin-sheet thermoforming includes a step of first heating each material layer to a forming temperature, which is a temperature at which a material is pliable enough to be shaped into a desired form. Then, the softened material layer is positioned on a mold having a desired shape. The two molds used in this process are not mating male and female molds, but are shaped to separately create different portions of a final component which are combined after the portions are formed. The positioning step includes securing the edges of each material layer to its respective mold, e.g., by clamps.

Each material layer then undergoes a drawing step, in which the material layer is vacuum-molded against the mold. The mold is apertured such that a negative or vacuum pressure is created through the forming surface when a drawing device is activated to create a vacuum in the mold. Preferably, each material layer has a hot tensile strength adequate to allow the material layer to stretch uniformly onto and around the mold. External or positive air pressure can be applied to the material layer opposite to the forming surface to assist in forcing the material layer firmly into the forming surface.

As a result of the drawing step, each material layer assumes the shape of the mold that it is positioned over. Each material layer is then allowed to cool on its mold to a set temperature, at which the material layer hardens sufficiently to permit removal of the material layer from the mold without a resulting deformation. When the material layer belongs to a particular class of materials, as discussed below, the assumed shape is permanent under normal usage. The two formed layers are then attached to one another (e.g., by gluing or welding) and trimmed to a desired component shape. Alternatively, the two material layers can be combined while they are still positioned on their molds. This is accomplished by bringing the molds toward each other until the material layers contact one another, while both material layers are at a temperature allowing adhesion by such resulting pressure.

Both of the above-described processes are constrained in several ways. For example, each process requires two molds, which must be separately heated and cooled. In addition to operating costs, mold costs are very high due to dual-mold requirements, heat dissipation, and high-cost mold materials. For durability reasons, molds used in twin-sheet processing must be made of steel, which is relatively expensive to cut and is difficult to handle. This cost is then multiplied by the number of sizes that will be manufactured for a given shoe design. Also, cycle times using a two-mold, twin-sheet process are typically between 60 and 90 seconds, which is not conducive to mass production. Further, the cost-per-unit is often prohibitively high due to the significant costs of multiple materials, the combining/assembly process and associated labor, and the costs associated with defects.

Further, with respect to the foam-backing process, molded uppers made using this method are relatively heavy, due to the combination of materials used. In addition, the molded uppers cannot be made breathable by the above-described process itself; additional processes are required to create apertures in the molded uppers for this purpose. Such additional processes are expensive, time-consuming, and often ineffective or less effective than desired. Further, the described process does not allow for the creation of surface textures on the molded uppers, as the molding surfaces can not be realistically processed to include such texturing, due to the hardness of the mold materials. For the same reason, graphics desired on the uppers are limited to the outer-most surface and have no three-dimensional quality. Typically, any desired aesthetic or structural attachments are limited to those of the stitch-on or adhesive variety. Moreover, undercuts in an upper are not possible due to the dual-mold requirement.

Twin-sheet manufacturing processes can also be disadvantageous in not providing optimal combinations of structural support, cushioning, and flexibility, while allowing for efficient manufacturing, factoring into consideration costs associated with materials, tooling, and labor. Also, this process does not provide for the integration of additional insert material layers during the thermoforming process such that the insert material layers are heat-bonded and vacuum-bonded to the formed component. Further, twin-sheet processing does not allow for the use of male-shaped molds in an efficient way.

BRIEF SUMMARY OF THE INVENTION

It is an object of the present invention to avoid or reduce at least some of the above problems and/or restrictions by providing a method and apparatus for forming footwear structures by using a single sheet thermoforming process. Single sheet thermoforming can be used to form a single material layer or can be used to combine two or more material layers to form a single composite layer. The present invention also provides advantageous footwear structures that have not heretofore been available.

In accordance with an aspect of the present invention, a method of manufacturing a footwear structure is provided. The method includes a step of overlaying two or more material layers such that the two material layers are in contact with one another, with the two material layers heated to a forming temperature. The two material layers are then vacuum-formed together to form a composite material layer in a three-dimensional form of the footwear structure.

In accordance with another aspect of the present invention, a method of manufacturing a footwear structure is provided. The method includes positioning a first material layer and a second material layer on a forming surface of a molding device, where the second material layer is positioned between the first material layer and the forming surface. The forming surface has a predetermined shape, such as the shape of a footwear structure. The first and second material layers are drawn toward the forming surface such that the first and second material layers conform to a shape of the forming surface.

In accordance with further aspect of the present invention, a forming apparatus for creating a footwear structure in a single-sheet thermoforming process is provided. The forming apparatus includes a molding device having a drawing device configured to create a vacuum in an interior space of the molding device. Also included in the molding device is a forming surface acting as a boundary of the interior space, with the forming surface including an aperture configured to allow air passage and a recessed area. Activation of the drawing device creates a vacuum pressure through the aperture such that a material layer positioned on the forming surface is drawn against the forming surface and a corresponding portion of the material layer permanently assumes the shape of the recessed area. The recessed area is shaped such that the corresponding recessed portion of the material layer provides cushioning and/or stiffening for a user.

In accordance with a still further aspect of the present invention, a footwear structure is provided. The footwear structure includes an upper and a sole assembly attached to the upper. The sole assembly includes a first material layer made of a thermoplastic and a second material layer attached to the first material layer. The first material layer includes a recessed area including a flat support portion, and is transparent or translucent. The second material layer includes a portion that is positioned on a surface of the recessed area, and a color of the second material layer indicates a location and/or a function of the second material layer.

In accordance with another aspect of the present invention, a footwear structure is provided. The footwear structure includes an upper and a sole assembly attached to the upper. The sole assembly includes a first material layer made of a thermoplastic, and a second material layer heat-bonded and vacuum-bonded to the first material layer. The first material layer includes a recessed area configured to provide cushioning or stability for a user. The second material layer includes a portion that is positioned on a surface of the recessed area.

In accordance with yet another aspect of the present invention, an upper footwear structure is provided. The upper footwear structure includes a first material layer made of a thermoplastic, and a second material layer heat-bonded and vacuum-bonded to the first material layer.

In accordance with a further aspect of the present invention, a sole assembly is provided. The sole assembly includes a first material layer made of a thermoplastic, where the first material layer includes a recessed area formed from the first material layer. Also, the recessed area includes a flat support portion, a recess opening on a first surface of the first material layer, and a recess sidewall connecting the flat support portion to the recess opening.

Other features and advantageous aspects of the invention will become apparent from the detailed description of embodiments of the invention herein which are provided as examples. It is to be understood that various features of the embodiments could be utilized independent of other features. In other words, not every feature of each embodiment need be incorporated in a given shoe design or a manufacturing method in practicing the present invention. Thus, the illustrated embodiments are intended as examples and are not to be construed as limiting.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain principles and illustrate examples of the invention.

FIGS. 8A and 8B are different views of an upper in accordance with an aspect of the present invention.

FIG. 8C is a detailed view of a positioning step of upper elements shown in FIGS. 8A and 8B.

FIGS. 10A–10D are perspective views of middle sole assemblies in accordance with aspects of the present invention.

FIGS. 11A–11D are different views of outer sole assemblies in accordance with aspects of the present invention.

DETAILED DESCRIPTION OF THE INVENTION

Figure 1:
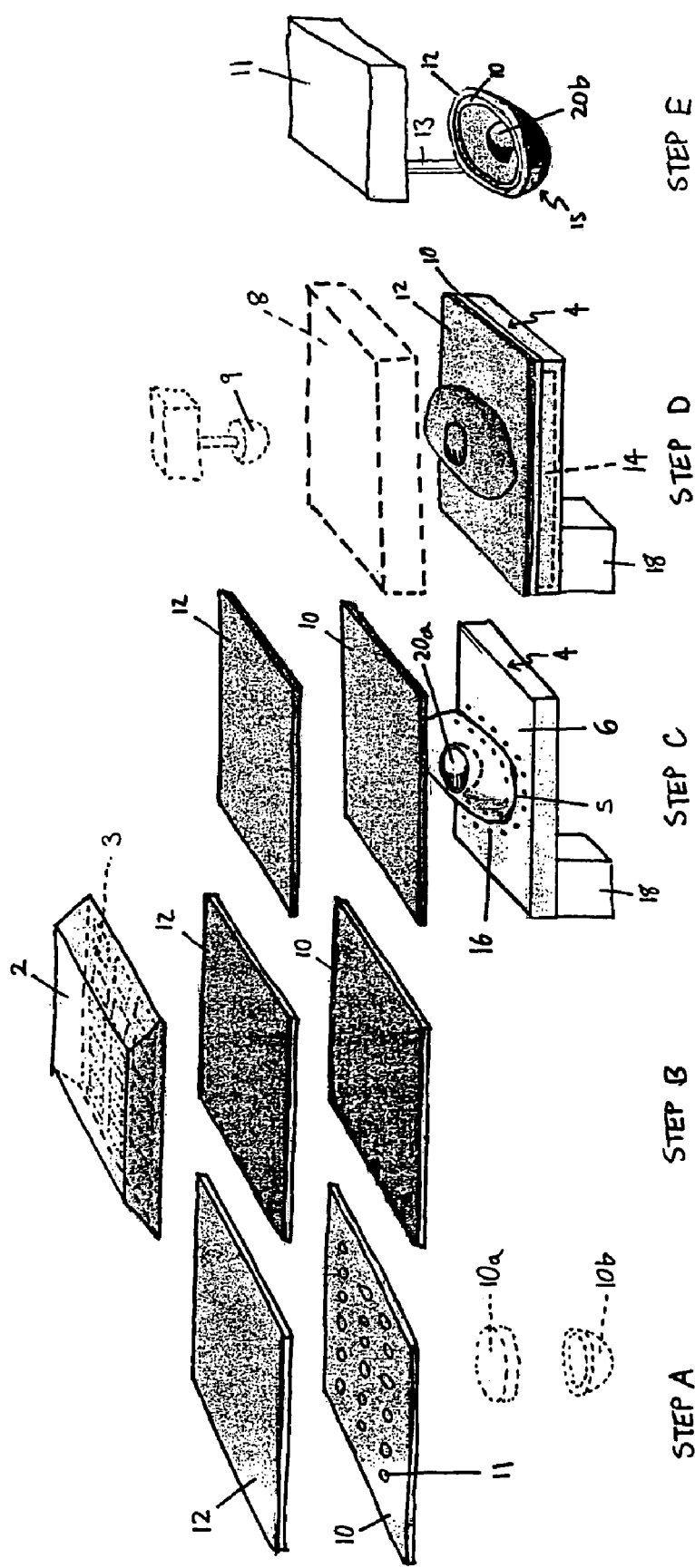
FIG. 1 is schematic representation of a forming process using two material layers in accordance with an aspect of the present invention.

Referring now to the drawings, where like reference numeral designations identify the same or corresponding parts throughout the several views, several embodiments of the present invention will now be described.

In accordance with a preferred method of manufacturing a footwear structure, such as an upper or a sole assembly, a single-sheet, single-face mold, thermoforming process is used to create a complete footwear structure. In this way, many of the shortcomings associated with the above-described known processes can be avoided. For example, using the preferred method, the need to create a mating half-component on an additional mold, as required in twin-sheet processing, is eliminated. Also, the process of single-sheet thermoforming can be used to create a composite sheet in the form of a footwear structure from two or more material layers using only a single forming surface, a concept that is novel to the present invention. Further, a typical cycle time for a single sheet process is between 2 and 30 seconds, which is much faster relative to a twin sheet cycle time. Moreover, the amount of pressure necessary to remove a formed structure from a single-face mold in a single-sheet process is much less than that which is required in twin-sheet processing. This difference is due to the fact that in twin-sheet processing, the formed structure must be removed from two opposing molding surfaces.

A method for manufacturing a composite component, such as a footwear structure, is shown in FIG. 1. In this method, the general concept of thermoforming is adapted to create a composite component from two separate material layers using only one forming surface. The steps of the process are performed by different components of a forming apparatus, which includes a heating device 2, a molding device 4, an optional pressure unit 8, and a trimming device 11.

In Step A, a material layer 10 and a material layer 12 are provided for the thermoforming process. The material layers 10 and 12 are shown apart in FIG. 1, but generally undergo the subsequent steps in contact with one another. Also, the material layers 10 and 12 can each be separated from a continuous supply of material (e.g., by a cutting device) before undergoing any of the thermoforming steps. The material layer 12 can simply be overlaid on the material layer 10 during the described process or can be attached to the material layer 10 with the use of a bonding agent or any other attaching means known in the art of sheet forming.

The material layers 10 and 12 are shown in FIG. 1 as square-shaped sheets of a single size, shape, and thickness, but can alternatively be of any shape and thickness, depending on the characteristics desired in the composite structure. For example, the material layer 10 can be smaller in size and of a different shape than the material layer 12. FIG. 1 illustrates two alternative shapes and sizes for the material layer 10. The version of shape 10a shows the material layer 10 as a layer shaped to be primarily drawn into the recessed area 20a (Step C) of the forming surface 6 only. The shape 10a can also be alternatively sized such that a portion of the shape 10a is also drawn against a surrounding portion of the forming surface 6.

In the version of shape 10b, the material layer 10 is arranged as a pre-formed and/or rigid structure that fits into the recessed area 20a and, alternatively, also against surrounding portions of the recessed area 20a. In the case of shape 10b, the material layer 10 can be placed into the recessed area 20a before the heating and drawing of material layer 12. When the material layer is arranged as the pre-formed material layer 10b, the heating performed in Step B is controlled such that the shape of the material layer 10b is not altered or destroyed. Optionally, according to a form preferred for certain shoe structures, the material layer 10 can include plural preformed protrusions or recesses, such that when it is combined with the material layer 12, the material layer 10 provides a web of inserts that are associated with projections or recesses of the material layer 12.

Also, the material layer 10 can also consist of two or more separate sub-sheets, instead of the single sheet represented in FIG. 1. Further, the material layers 10 and 12 can be of different thicknesses, and one or both of the material layers 10 and 12 can be of even or uneven thickness, depending on the characteristics desired in the formed structure. The material layers 10 and 12 can be made of the same material or of different materials. The material layers 10 and 12 can each be made of a thermoplastic material (e.g., thermoplastic polyurethane or "TPU"), a thermoset plastic (e.g., thermoset polyurethane), or any other formable material suitable for multiple-layer thermoforming (e.g., partial-thermoset plastic).

Thermoplastic materials ("thermoplastics") are polymers that can be softened (by heating) and hardened (by cooling) multiple times without undergoing any appreciable chemical change. An example of a particularly preferred thermoplastic material is thermoplastic polyurethane, particularly 94 Shore A thermoplastic polyurethane sheet, which is generally around 0.010 inches thick. The thickness of the sheet is selected according to design criteria, but will generally range from around 0.040 to around 0.100 inches, depending on the particular material properties. For example, particularly preferred thicknesses for 94 Shore A thermoplastic polyurethane ranges from about 0.060 inches to about 0.080 inches.

In contrast to thermoplastics, thermoset plastics ("thermosets") are more permanently rigid once they have been cooled. Both materials, once hardened, have good resistance to weather, pressure, and temperature, while still providing a wide range of flexibility.

Alternatively, one of the material layers 10 and 12 can be a textile material, leather, or any other formable material suitable for high-temperature vacuum forming. Also, one or both of the material layers 10 and 12 can include a graphic design that is maintained throughout the forming process. The graphic design can be silk-screened, embroidered, embossed, or otherwise transferred to a material layer before or during any of the forming steps. For example, a graphic design can be transferred to a material layer through an in-mold transfer, in which color detail is first provided on a portion of a forming surface and then transferred to a corresponding portion of the material layer during a vacuum-forming step.

Further, one or both of the material layers 10 and 12 can be transparent or translucent for the purpose of displaying a graphic design, of allowing visibility of another structure in a final product, or simply as a cosmetic design choice, for example. Where the layers become associated with each other upon thermoforming, one of the layers can be porous or include apertures so that the layers can be drawn into the mold as they are joined together. The provision of apertures/porosity can result from the characteristics of the material itself, and/or the apertures/porosity can be added (e.g., with leather-like or vinyl materials) by impaling the material. As a further example, one of the layers need not be porous if they have sufficiently different sizes such that one of the layers can be drawn against the other without requiring air apertures/pores.

The material layer 10 is positioned between the material layer 12 and the forming surface 6 (Step C) and optionally includes a plurality of apertures 11. The creation of a composite structure through single-sheet thermoforming requires the evacuation of air between the material layers. Thus, if the material layers 10 and 12 are substantially of the same size, the material layer 12 will only be drawn against the forming surface 6 during a drawing step if air is permitted to penetrate through material layer 10. Accordingly, in this case, the apertures 11 are sized, shaped, and arranged such that the material layer 10 is porous with respect to the forming surface 6.

Alternatively, if the material layer 10 is smaller in size than the forming surface 6 (e.g., if the material layer 10 is in the form of shape 10a or shape 10b), then inclusion of the apertures 11 may not be necessary, as the air between the material layers 10 and 12 can be evacuated from or around the periphery of the material layer 10. Even if one of the layers is relatively small, the use of apertures or pores could be helpful in certain arrangements, for example, where the layer is to be deeply drawn into the mold.

In Step B, a heating device 2 increases the temperatures of each of the material layers 10 and 12 to a forming temperature. In a situation where the material layer 10 is configured as one of shapes 10a and 10b, the material layer 10 may not be required to undergo this heating step. The material layers 10 and 12 can be transported to a location of the heating device 2 by a conveying unit (not shown) or, alternatively, the heating device 2 can be moved to a location of the material layers 10 and 12 in the forming apparatus.

The heating device 2 can perform heating of the material layers 10 and 12. According to a preferred form, the heating device optionally includes a heating array including multiple heating elements 3, where each heating element 3 is arranged as a ceramic heater associated with its own thermocouple. With this arrangement, each heating element 3 can be individually controlled such that different areas of the material layers 10 and 12 can be heated to different temperatures. Heating profiles can be programmed into a computer unit (not shown) that controls operation of the heating device 2. Alternatively, the heating device 2 can apply heat to the material layers 10 and 12 by any other methods known in the art relating to material sheet heating. Also, the heating device 2 is shown in FIG. 1 as providing heat to the material layers 10 and 12 from only one direction; however, alternatively, a heating device 2 can include an additional unit to provide heat to the material layers 10 and 12 from an opposite direction or any other direction. By selectively controlling the heating of different regions of a sheet, the temperature of a given portion of the sheet can more optionally match the shape to which it will be molded.

Figure 2:
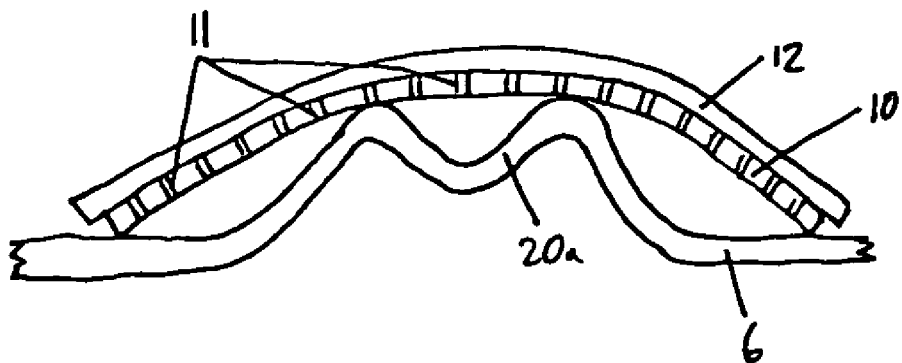
FIG. 2 is a cross-sectional representation of the positioning step in FIG. 1.

The material layers 10 and 12 are positioned on the forming surface 6 of the molding device 4 in Step C. A cutaway view of the positioning step is shown in FIG. 2, where the material layers 10 and 12 are shown to simply rest against portions of the forming surface 6. As with Step B, the material layers 10 and 12 can be transported to the location of the molding device 4 or vice versa. Also, alternatively, the steps of Step B and Step C can be performed concurrently such that the material layers 10 and 12 are heated by the heating device 2 while positioned on the forming surface 6. Further, additional heat can be provided to the material layers 10 and 12 via the forming surface 6, which can include integral heating elements or can be otherwise heated to soften the material layers 10 and 12. The material layers 10 and 12 can be temporarily fixed to the forming surface 6 by clamping components or by any other means known in the art.

The forming surface 6 can be made of aluminum, plastic, wood, or any other rigid material suitable for high-temperature vacuum forming. Because the forming surface 6 is used in single-sheet processing, the use of steel for its manufacture is not required, although the forming surface 6 can certainly be made of steel. The forming surface 6 can be shaped as any desired form, such as the form of a footwear structure, and includes the recessed area 20a. Alternatively, the forming surface 6 can be arranged without the recessed area 20a. The recessed area 20a is shaped such that a portion of a material layer drawn against the forming surface 6 will assume the shape of the recessed area 20a to form a corresponding recessed portion 20b (Step E) in the material layer. In the environment of footwear, the recessed portion 20b can be shaped to provide cushioning and/or stability to a wearer. For example, the hemispherical form of the recessed portion 20b is shaped to deform and absorb at least some of the shock transmitted to the wearer during ordinary use of the shoe in which the structure is included. In FIG. 1, the recessed area 20a is shown to be on a top portion of the forming surface 6; however, alternatively, the recessed area 20a can be positioned on a sidewall portion of the forming surface 6.

The shape of the forming surface 6 as shown in FIG. 1 is merely a non-limiting example; composite structures of many different geometries can be achieved by using the preferred method. For example, the forming surface 6 can be shaped to form various footwear structures, such as an upper or a sole assembly. Also, the shape of the recessed area 20a in FIG. 1 serves only as a non-limiting example and can be any desired geometry. For example, the recessed area 20a can instead be arranged as a protruding area.

Further, the forming surface 6 can include a surface texture that is transferred to a surface of one or both of the material layers 10 and 12 during a drawing step. For example, the transferred surface texture can replicate the natural surface texture of another type of material, such as leather. Alternatively, or additionally, the material for one or both of the layers can be performed with a desired surface texture. Also, the forming surface 6 can include an embossed decorative design, such as a corporate logo, that is transferred to a surface of one or both of the material layers 10 and 12 during a drawing step. Moreover, a portion of the forming surface, such as the recessed area 20a, can be coated with a coloring agent such that the drawing step results in a transfer of color from the forming surface 6 to one or both of the material layers 10 and 12.

The forming surface 6 includes a plurality of apertures 16, which allow airflow through the forming surface 6 and which can be of any size or shape suitable for vacuum forming. Apertures 16 can be selectively positioned on the forming surface 6 to achieve a desired vacuum effect, or can be closely and evenly arranged such that the forming surface 6 resembles a mesh material. The number, size, shape, and arrangement of the aperture 16 will determine the types of materials that can be drawn against the forming surface 6. That is, only material layers that are non-porous with respect to the forming surface 6 will be vacuum-formed against the forming surface 6 during Step D of FIG. 1.

The forming surface 6 is arranged as a male mold component in FIG. 1; that is, the primary shape of the forming surface 6 protrudes away from the molding device 4. However, in an alternate embodiment, the forming surface 6 can be arranged as a female mold component, in which case the primary shape of the forming surface 6 is recessed toward the molding device 4.

Figure 3A:
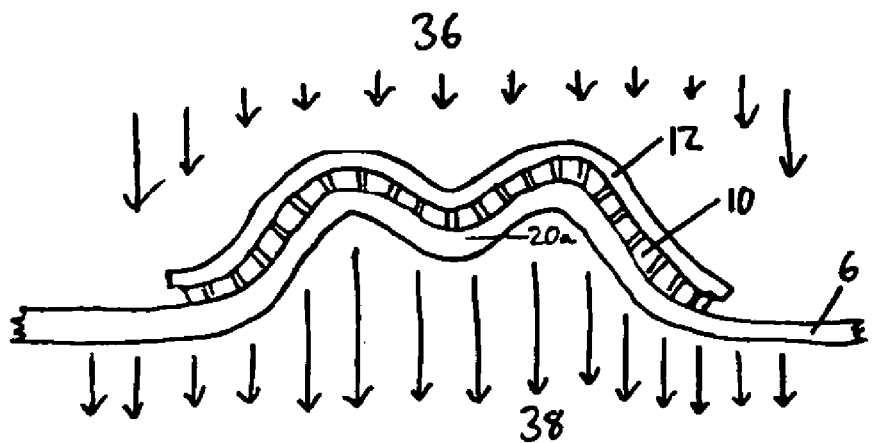
FIGS. 3a and 3b are cross-sectional representations of the drawing step in FIG. 1.

After the softened material layers 10 and 12 are positioned on the forming surface 6, Step D is performed to draw the material layers 10 and 12 against the forming surface 6. In this drawing step, as also shown in the cutaway view of FIG. 3a, the molding device 4 is operated such that the softened material layer 12 is drawn toward the forming surface 6, thereby also drawing the material layer 10, which may or may not be softened by heating, toward the forming surface 6. Although the material layer 12 is of a sufficiently low porosity such that it can be drawn toward the forming surface 6, the material layer 12 can still possess enough porosity to provide utility during the use of a final product incorporating the material layer 12. For example, both material layers 10 and 12 can be of porosities high enough such that a composite component made from these two layers can provide breathability to a user when worn.

The drawing of material layers 10 and 12 is accomplished by creating a vacuum within an interior area 14 of the molding device 4 by use of a vacuum unit 18, which evacuates any air contained in the interior area 14. The negative or vacuum pressure draws the material layer 12 toward the forming surface 6 through the apertures 16, thereby evacuating any air between the material layers 10 and 12. Again, as explained above, the evacuation of air between the material layers 10 and 12 is achieved in this step by the use of apertures 11 in the material layer 10 or due to the size difference between the material layers 10 and 12. The direction of air force experienced by material layers 10 and 12 is illustrated by arrows 38 in FIG. 3a. Optionally, the pressure unit 8 creates a positive air pressure in the form of multiple air jets 36 (FIG. 3a) toward the forming surface 6, thereby further forcing the material layer 12 toward the forming surface 6.

Additionally or alternatively with respect to the use of the pressure unit 8, an external plug component 9 can be used to further urge the material layer 12 against the forming surface 6 in the recessed area 20a. The plug component 9 need not be applied to the material layer 12 with a relatively great amount of pressure, but only enough to ensure full compliance with the shape of the recessed area 20a during the drawing step.

The drawing step results in the conforming of the material layers 10 and 12 to the shape of the forming surface 6, including the recessed area 20a. Even if the material layer 10 is porous with respect to the forming surface 6 and does not directly experience the generated vacuum pressure, the material layer 10 will conform to the shape of the forming surface 6 due its position between the forming surface 6 and the material layer 12. The material layers 10 and 12 can be permanently adhered to one another as a result of the drawing step, or can be easily separated after the drawing step. One situation where the latter case is desirable is when only the forming of the material layer 10 is needed, but the material layer 10 is porous with respect to the forming surface 6. In this situation, the material layer 12 is used solely as a non-porous backing layer, which is removed after the forming of the material layer 10.

In the case of permanent adherence, the drawing step creates a permanent bond between the material layers 10 and 12, thereby eliminating the need for an additional lamination or combining step. The permanent bond is "permanent" in the sense that ordinary use of the formed composite structure 15 will typically not result in separation of the material layers 10 and 12. The bond between the material layers 10 and 12 acts as both a heat-bond and a vacuum-bond. The heat-bond aspect relates to the material interface between the material layers 10 and 12 resulting from the heating step, from the contact between the material layers 10 and 12, and from subsequent cooling of the material layers 10 and 12. That is, the heat-bond forms an adherence regardless of the shapes and conformity of the material layers 10 and 12. In addition to the heat-bond is the vacuum-bond, which relates to the conformity of both the material layers 10 and 12 to a single shape. The vacuum-bond enhances the strength of the heat-bond, especially if geometries built into the forming surface 6 (e.g., recessed area 20a) are transferred to the material layers 10 and 12 during a drawing step and counteract any natural urge for the material layers 10 and 12 to separate.

Figure 3B:
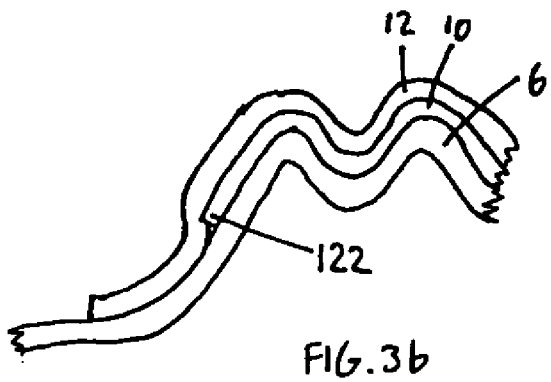

When the material layer 10 is smaller than the forming surface 6, an edge portion 122 of the material layer 10 is received into the material layer 12 during the drawing step, as shown in the detailed cutaway view of FIG. 3b. This figure also illustrates that when the material layer 10 is smaller than the forming surface 6, the surface of the material layer 12 contacting the forming surface 6 is flush with the surface of the material layer 10 contacting the forming surface 6. Both of these effects are achieved not only when the material layer 10 is smaller than the forming surface 6, but also when the material layer 10 includes or forms an opening (e.g., with an additional material layer) through which the material layer 12 can penetrate and contact the forming surface 6.

Figure 10B:
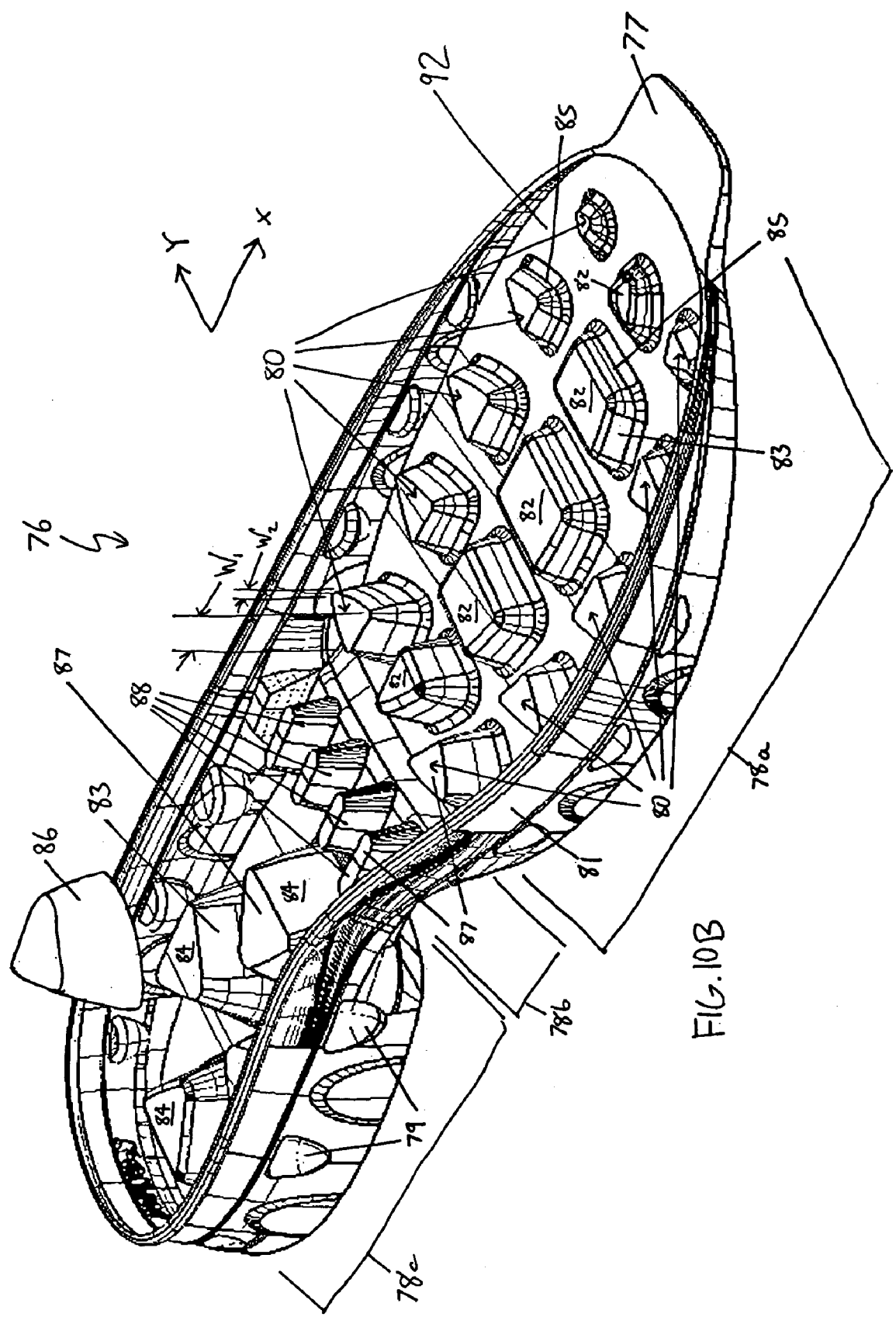
Figure 10C:
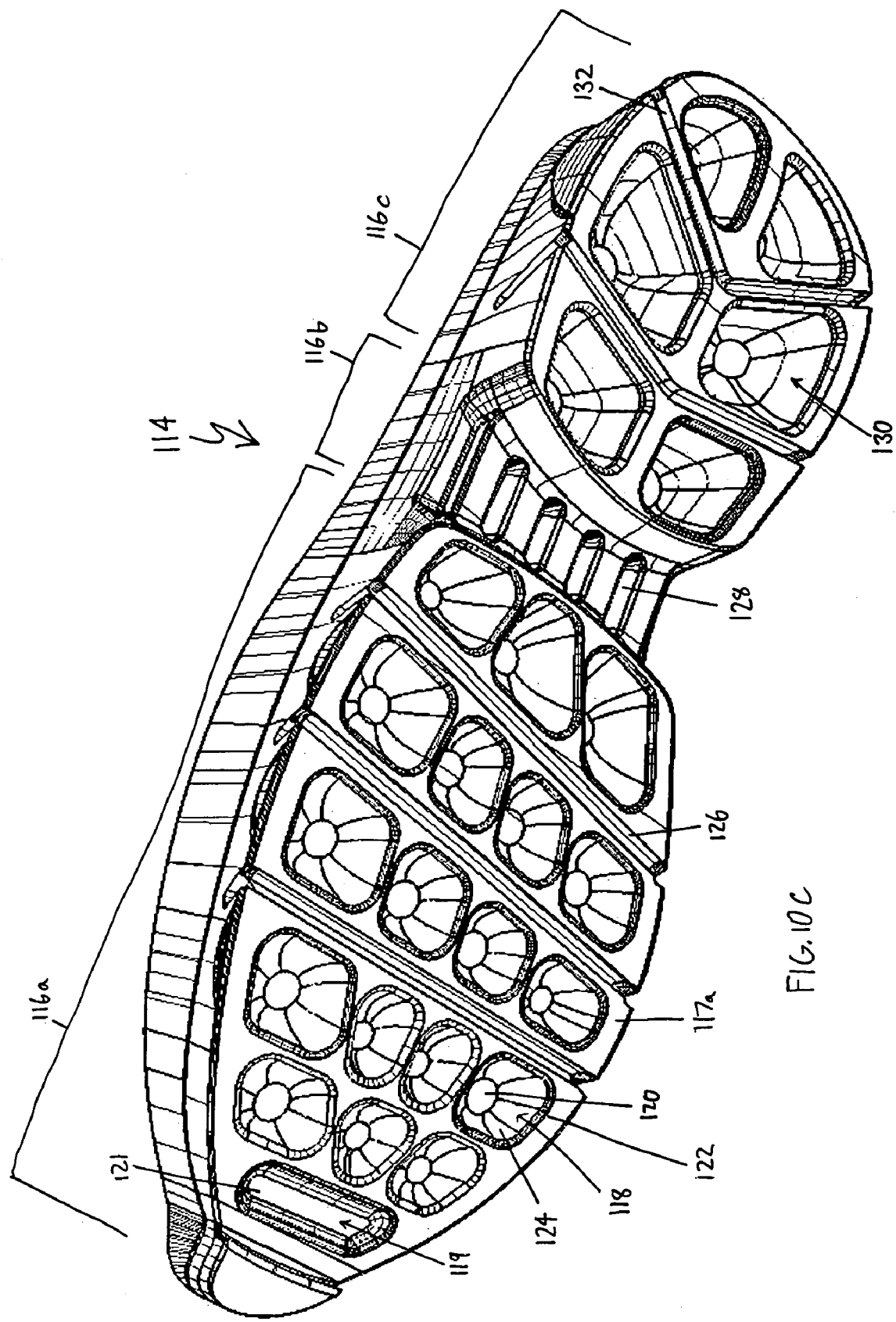
Figure 10D:
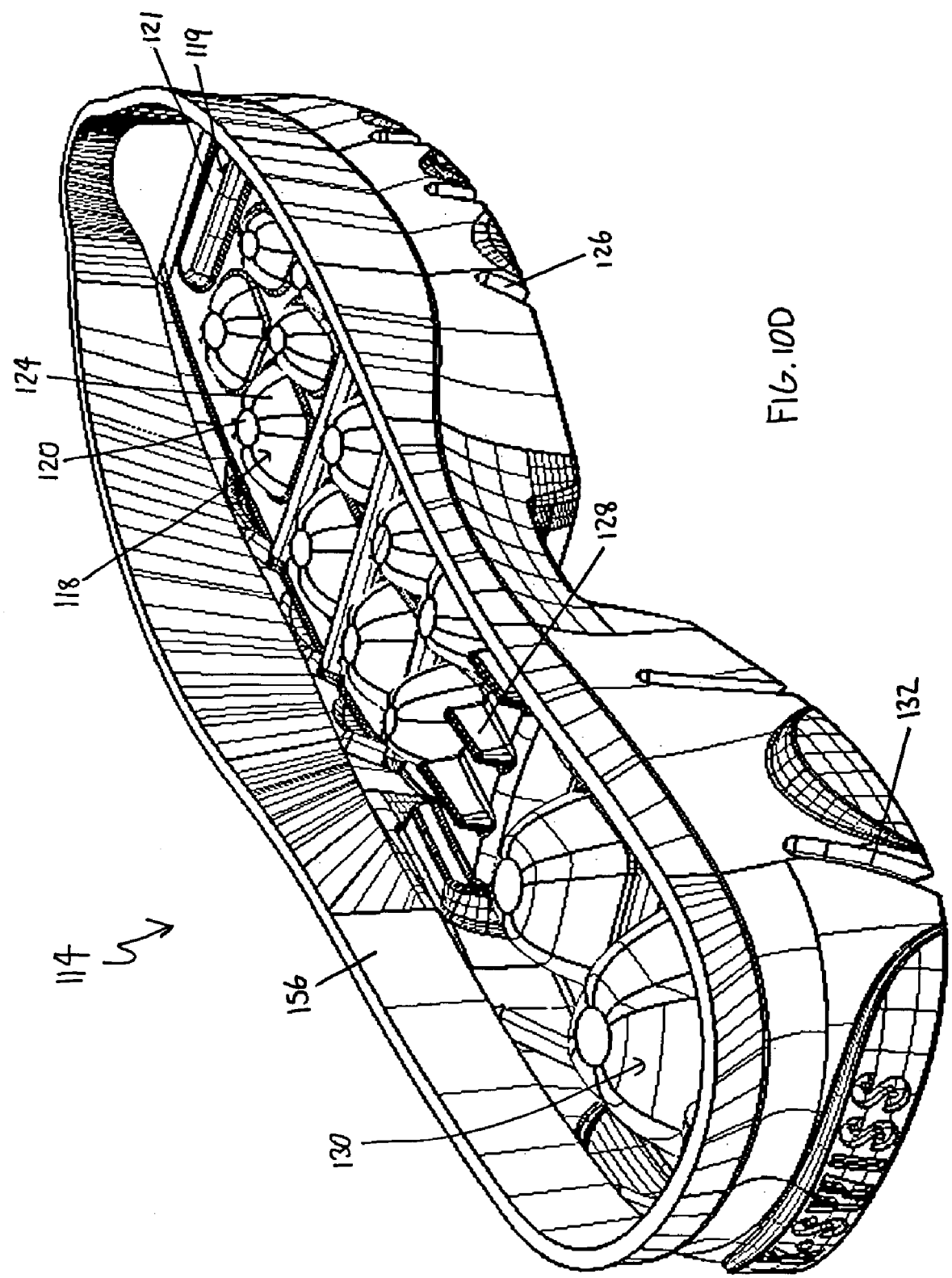

Step E includes removing the formed composite structure 15 from the forming surface 6 and trimming the composite structure 15 to remove any excess material, such as the trim material 156 shown in FIG. 10D. For purposes of illustration, the composite structure 15 is shown in an inverse position, where the recessed area 20b is shown as a protrusion. The composite structure 15 is removed from the forming surface when its form has set, which occurs when the composite structure 15 cools to a specific temperature. The composite structure 15 can undergo unassisted cooling during this step or can be exposed to cooling elements such as Peltier elements, for example. When the material layers 10 and 12 are formed from thermoplastic polyurethane, the necessary time for cooling and setting is relatively short, and the resulting composite structure 15 is flexible even when set, such that it can be easily removed from the forming surface 6 even if the geometry of the forming surface 6 includes side undercuts.

The trimming step is performed after the composite structure 15 is removed from the forming surface 6. The trimming device 11 performs the trimming step with a cutting element 13, which can be arranged as a knife-edged component, a laser beam, or any other means suitable for trimming sheet material. The function of the trimming device 11 can be aided by the use of a trimming groove 5 (Step C of FIG. 1), the form of which can be included in the forming surface 6 and transferred to one or both of the material layers 10 and 12 during the drawing step. When the composite structure 15 includes a transferred trimming groove, the cutting element 13 trims the composite structure 15 along the transferred trimming groove.

Step E can also include other processing steps that can be performed before, during, or after the trimming step. For example, traction components (such as rubber elements) can be adhered to a surface of the composite structure 15. Alternatively, a traction layer can be created on a surface of the composite structure 15 by, for example, spraying rubber or any other traction-providing material on the surface of the composite structure 15. The spraying of a traction-layer onto the composite structure 15 can also obviate the need to add an additional insert material layer (as described below and shown in FIG. 7). That is, a sprayed-on traction material may provide a sufficient amount of cushioning and/or structural support desired in a structure without the use of insert material layers. Also, the sprayed-on traction-providing material can additionally provide high abrasion resistance and/or be used as a decorative addition to the overall structure. A graphic design, such as a separately formed emblem or symbol, can be attached to the composite structure 15 anytime after the drawing step by contact-printing, spraying, or any other suitable process. Moreover, a lining component, such as a metal or plastic gasket, can be attached to the trimmed edge of the composite structure 15 for cosmetic and/or functional purposes.

Figure 4:
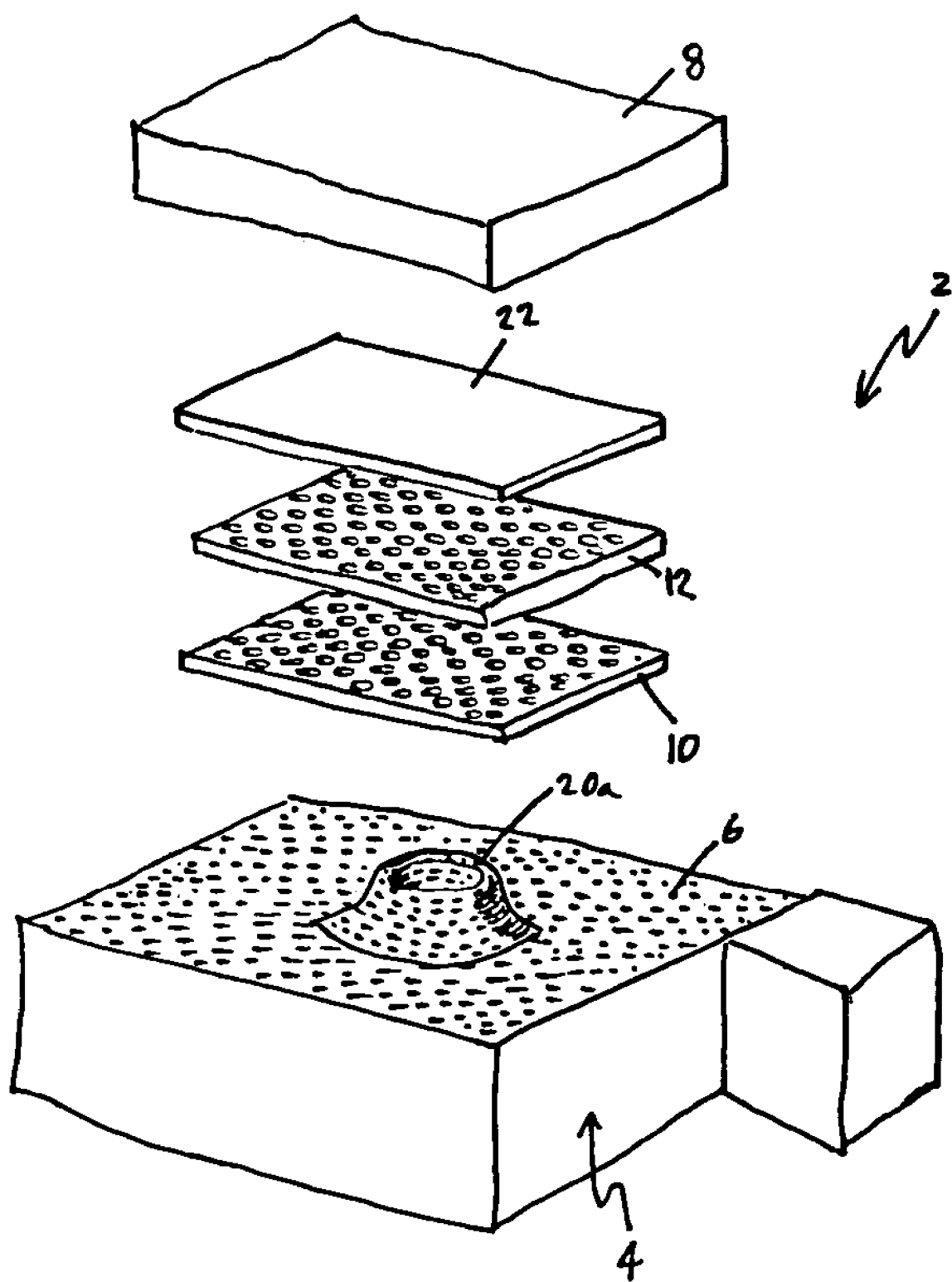
FIG. 4 is a simplified perspective view of a forming assembly in accordance with another aspect of the present invention.

In FIG. 4, an aspect of the present invention is shown where both material layers 10 and 12 are porous with respect to the forming surface 6. The material layers 10 and 12 can be of the same or different porosities. In this case, an additional, non-porous backing material layer 22 is required to form material layers 10 and 12 against the forming surface 6. The backing material layer 22 can be a thin sheet of silicon rubber, for example, or any other type of non-adhesive, non-porous material suitable for the preferred method.

Figure 5:
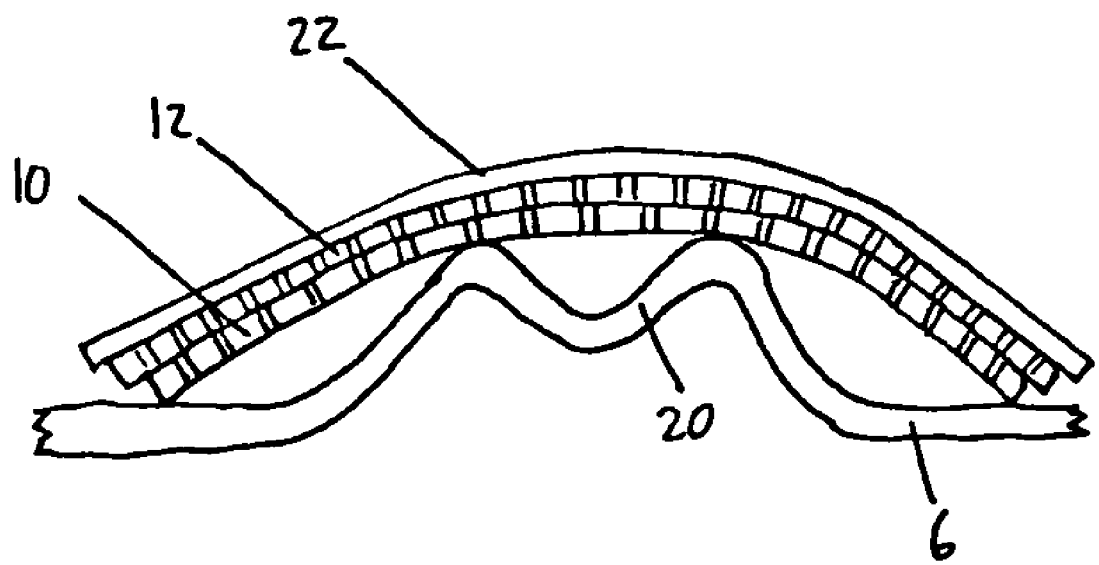
FIG. 5 is a cross-sectional representation of a positioning step using the forming assembly of FIG. 4.
Figure 6:
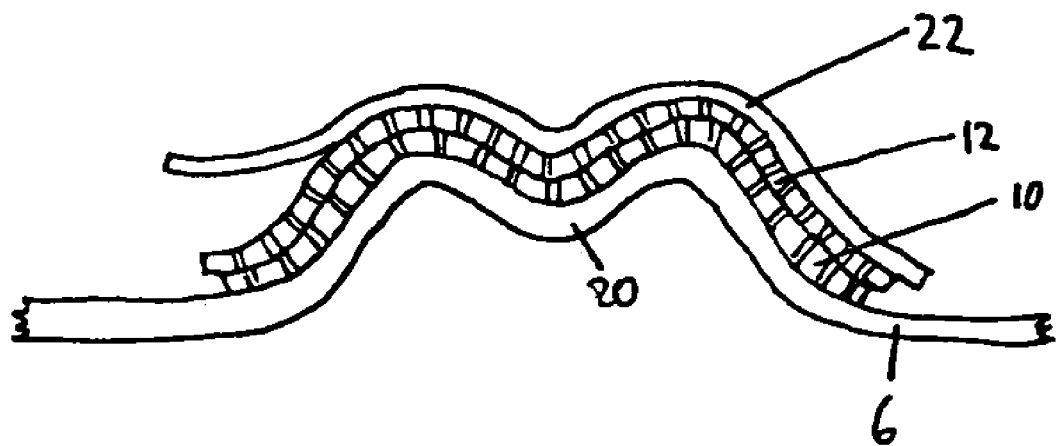
FIG. 6 is a cross-sectional representation of a drawing step using the forming assembly of FIG. 4.

As shown in FIG. 5, the material layers 10 and 12 are placed between the forming surface 6 and the material layer 22 before a drawing step. During the drawing step, as described above with respect to Step D of FIG. 1, the material layer 22 is drawn toward the forming surface 6, thereby also forcing material layers 10 and 12 against the forming surface 6, as shown in FIG. 6. Due to the characteristics of material layers 10 and 12, these layers are fused together in a shape conforming to that of the forming surface 6, as described above. However, the material layer 22 is used only for the purpose of providing a non-porous backing layer and does not adhere to the material layer 12. After material layers 10 and 12 are formed together, the material layer 22 is removed from the resulting composite component, as shown in FIG. 6.

Figure 7:
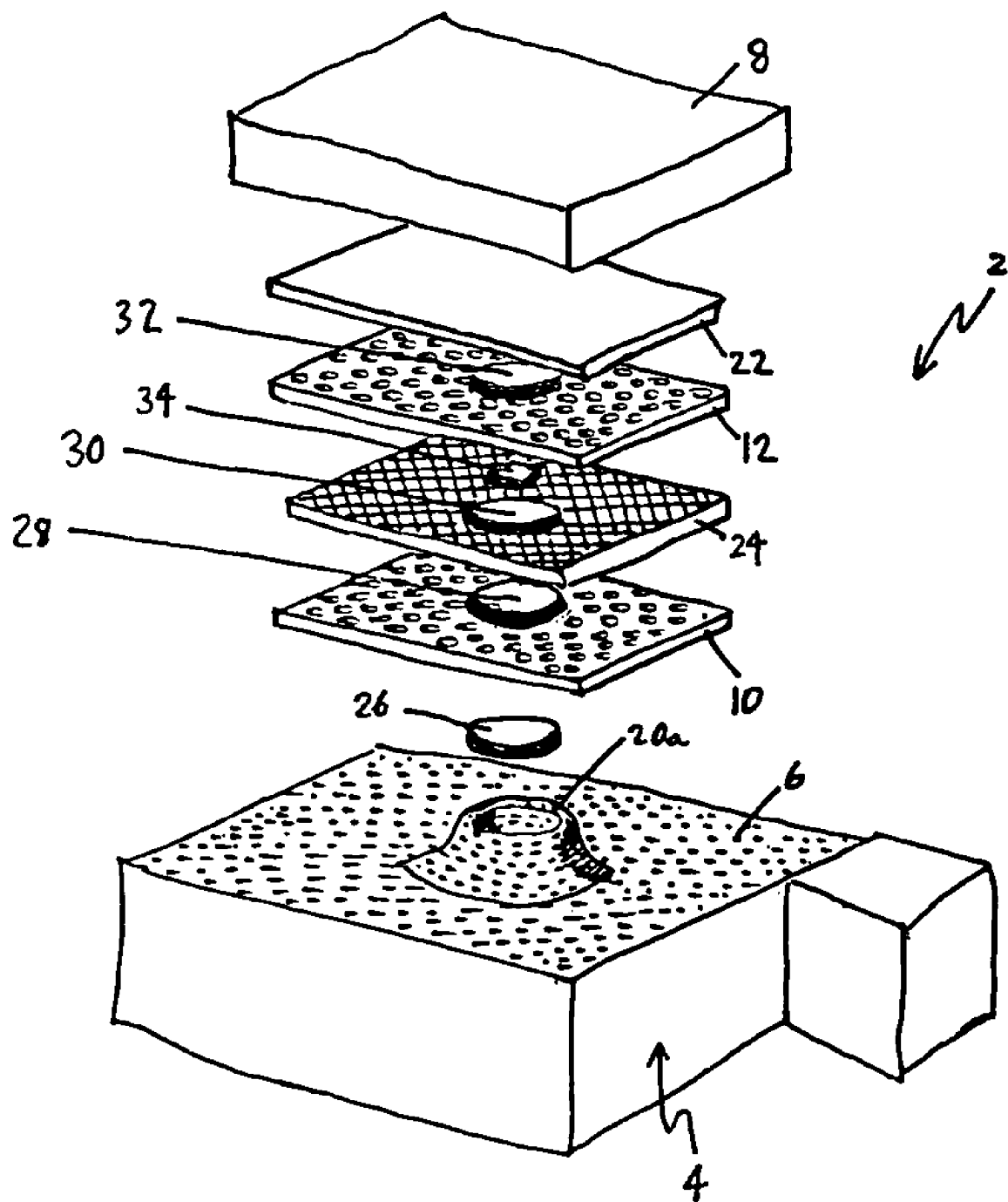
FIG. 7 is a simplified perspective view of a forming assembly in accordance with a further aspect of the present invention.

FIG. 7 shows additional components that can be added to the configurations of FIGS. 1 and 4. These components include a textile layer 24; insert material layers 26, 28, 30, and 32; and a graphic design 34. In the FIG. 7 example, the additional material layer 22 is only used when the material layer 12 is porous with respect to the molding device 4.

The textile layer 24 can be made of nylon mesh or any other textile material suitable for a thermoforming process. The textile layer 24 is placed between the material layers 10 and 12 and can be used to provide elasticity, flexibility, moisture absorption, or any other function related to the characteristics of the chosen textile material. Further, the textile layer 24 can include a graphic design 34, which can be printed or otherwise attached to the textile layer 24. In this case, one or both of the material layers 10 and 12 can be at least partially transparent so that the graphic design 34 can be viewed when a final product is complete. During a drawing step, the textile layer 24 is encapsulated between material layers 10 and 12. The textile layer 24 can adhere to one of the material layers 10 and 12 during the drawing step, or can be trapped within the composite component solely due to the adhesion between the material layers 10 and 12.

The insert material layers 26, 28, 30, and 32 can be used to provide additional structural support, cushioning support, aesthetic appeal, or any other characteristic desired in a composite structure. The insert material layers can be shaped in any desired geometry and can be made of thermosets, thermoplastics, or any injectable materials suitable for the preferred method. Further, each insert material layer can be perforated to provided breathability and can adhere to one of the material layers or the textile layer 24 during a drawing step. Additionally or alternatively, with regards to structural and cushioning support, an insert material layer can be a sealed component filled with a gas or liquid specifically selected to provide a support function. Also, similar to the textile layer 24, each insert material layer can include a graphic design, in which case one or both of the material layers 10 and 12 can be at least partially transparent so that the graphic design can be viewed when a final product is complete. Moreover, each insert material layer can be of a different color from other portions of a formed composite structure. The coloring of an insert material layer can indicate the location of the insert material layer within the composite structure (e.g., in the situation when one of the material layers is transparent or translucent) and the function of the insert material layer (e.g., increasing the stability of a portion of the composite structure where the insert material layer is located).

In FIG. 7, the insert material layers 26, 28, 30, and 32 are respectively positioned in the following positions: between the forming surface 6 and the material layer 10, between the material layer 10 and the textile layer 24, between the textile layer 24 and the material layer 12, and between the material layers 12 and 22. A composite structure can contain one, some, or all of the insert material layers 26, 28, and 30, and multiple insert material layers can be positioned in any of the various locations (e.g., two or more of the insert material layers 28 can be placed between the material layer 10 and the textile layer 24). Also, when the textile layer 24 is not required, one or both of the insert material layers 28 and 30 can be placed directly between the material layers 10 and 12. The non-limiting example of FIG. 7 illustrates the insert material layers 26, 28, 30, and 32 to be in line with one another above the recessed area 20a. Of course, these layers can be positioned in any arrangement to achieve a desired effect in a formed composite structure. For example, one of the insert material layers can be positioned such that the formed composite structure includes the insert material layer in a sidewall portion of the formed composite structure for purposes of cushioning and/or stabilizing.

By the preferred method, a nearly endless variety of composite components can be created. For example, while the material layers 10 and 12 and the textile layer 24 are shown to be identically and rectangularly shaped, each of these layers can be shaped in any desired geometries, including geometries with cut-out portions. By thermoforming multiple layers of material together in accordance with the preferred method, the deficiencies of current molding processes are avoided. For example, the preferred method does not require separate steps of lamination, stitching, or perforation, creating an unlaminated and breathable layering of materials that is lightweight, flexible, and inexpensive.

Some examples of composite footwear components that can be formed by the preferred method are described below.

A component that can be formed using the above-described process is an upper 39, as shown in FIGS. 8A and 8B. The upper 39 includes an inner material layer 40, an insert material layer 44, and an outer material layer 42, which have been combined and formed together in accordance with an aspect of the preferred process. When a male mold device is used, the material layers 40, 44, and 42 can respectively correspond to the material layers 12, 24, and 10 in FIG. 7. In a female mold configuration, the material layers 40, 44, and 42 can respectively correspond to the material layers 10, 24, and 12 in FIG. 7. In both case, the forming surface 6 shown in FIG. 7 would be shaped as the upper 39 (outer surface for a male mold, and inner surface for a female mold). Alternatively to the examples shown in FIGS. 8A and 8B, the upper 39 can include only the material layer 42 and the material layers 50, 52, and 54 attached to it.

The material layer 40 is made of a synthetic material, such as non-porous TPU, while the material layer 44 is a textile material, such as nylon. The material layer 42 can be non-porous (i.e., with respect to a forming surface used to form the upper 39) or porous, in which case the forming of the upper 39 requires the use of a non-porous backing material layer, such as material layer 40, in the case where a male mold is used.

Additional material layers 50, 52, and 54 can be used for structural support and/or for aesthetic purposes. Each of the material layers 50, 52, and 54 can be made of a thermoplastic, a thermoset, or any other natural or synthetic material that is formable by the preferred method. Also, each of the material layers 50, 52, and 54 can be porous or non-porous, depending the on the desired function of the component in the finished shoe unit.

As each of the material layers 50, 52, and 54 are smaller than the forming surface used to create the upper 39, they do not need to be apertured when a male mold is used, for reasons discussed above. In this situation, each of the material layers 50, 52, and 54 are first positioned onto a forming surface before the non-porous material layer 42 is overlaid on the material layers 50, 52, and 54. By using a male mold, a surface texture of a forming surface can be transferred to at least one of the material layers 42, 50, 52, and 54 while retaining high transparency for any of the material layers that are transparent before the thermoforming process. The use of a male mold for the upper 39 can also result in special surface effects discussed with regards to Step D of FIG. 1. For example, edge portions of the material layers 50, 52, and 54 can recess into the material layer 42, thus achieving the flush effect shown in FIG. 3b.

Also, the illusion of a hidden seam between material layers can be achieved in the upper 39. For example, if the material layers 52 and 50 do not overlap, but contact one another at a contact seam 53, this special surface effect can be created, as shown in FIG. 8C. In this figure, the forming surface 6 used to create the upper 39 includes a seam groove 55, which protrudes outwards from the forming surface 6. Due to the shape of the seam groove 55, the edge portion 57 of the material layer 52 and the edge portion 51 of the material layer 50 are positioned in such a way that they are turned away from each other and from the outer surfaces of the material layers 50 and 52. During a drawing step, the material layer 42 is heat-bonded and vacuum-bonded to the material layers 50 and 52 such that the edge portions 51 and 57 are permanently fixed in this position. When the formed upper 39 is removed from the forming surface 6, the edges of the material layers 50 and 52 at the contact seam 53 appear to be connected by invisible stitching.

The upper 39 includes an insert material layer 46 which can correspond to components 30 or 28 in FIG. 7; that is, the insert material layer 46 can be positioned between the material layers 40 and 44 or between the material layers 44 and 42. The insert material layer 46 includes apertures 48 arranged such that the insert material layer 46 is porous with respect to a forming component that is used to form the insert material layer 46. Also, the insert material layer 46 can be made of a thermoset, a thermoplastic, or any other synthetic or natural material that can be formed in accordance with the preferred method. The insert material layer 46 can be shaped to provide structural support and/or protection for a user's foot. Alternatively, one of the material layers 50, 52, and 54, which are located on an exterior surface of the upper 39, can be configured to provide such structural support and/or protection.

The upper 39 also includes recessed areas 43, which are three-dimensional geometries transferred from the forming surface used to create the upper 39 to the material layers of the upper 39. Each recessed area 43 is shaped to provide cushioning and/or stability to a wearer, who contacts the flat portions 45 of each recessed area 43 during use of the shoe in which the upper 39 is included. In the example of FIGS. 8A and 8B, the recessed areas 43 provide cushioning and/or stability to the ankle portions of a wearer.

Figure 9A:
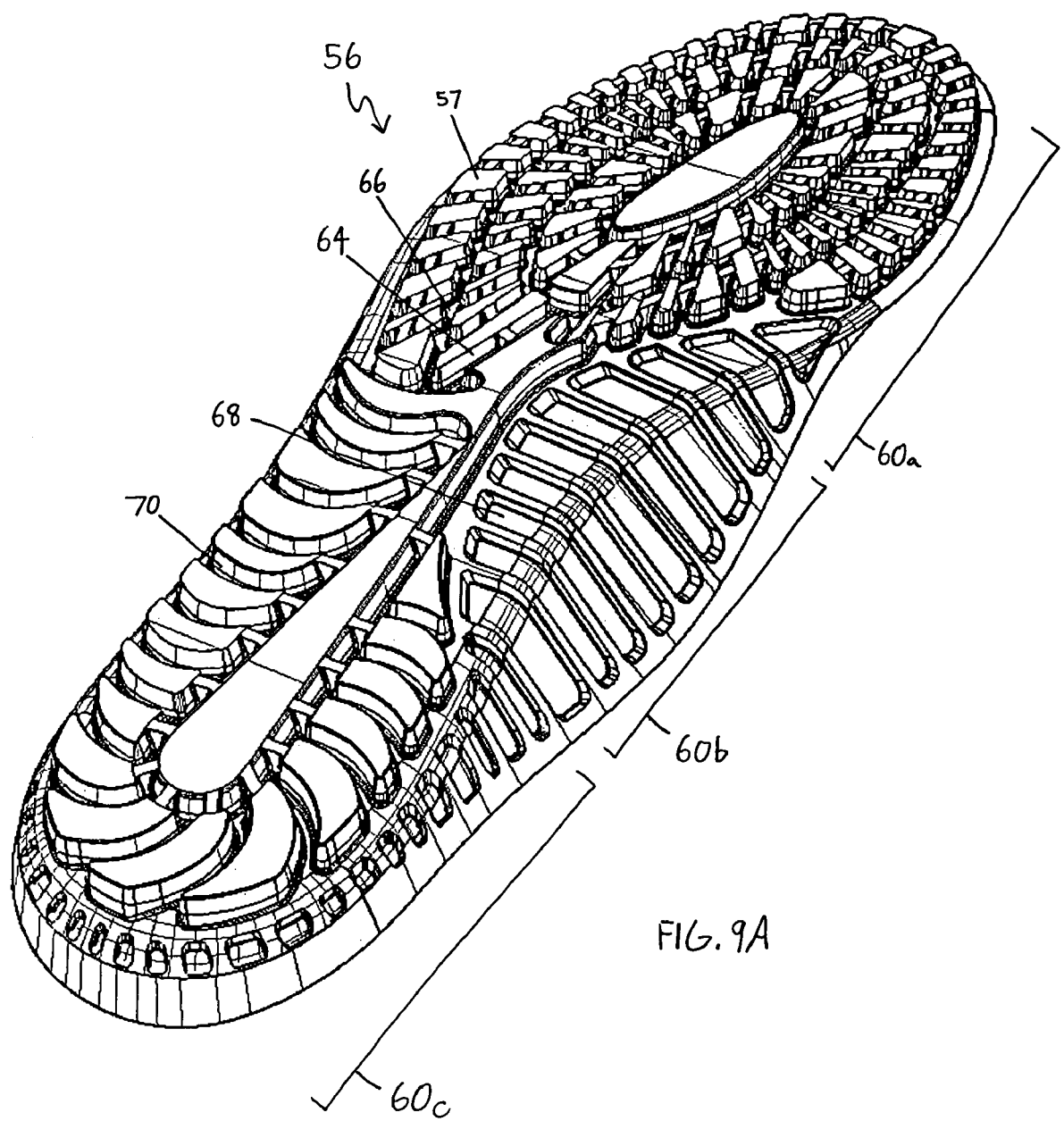
FIGS. 9A and 9B are lower surface views of two inner sole assemblies in accordance with aspects of the present invention.
Figure 9B:
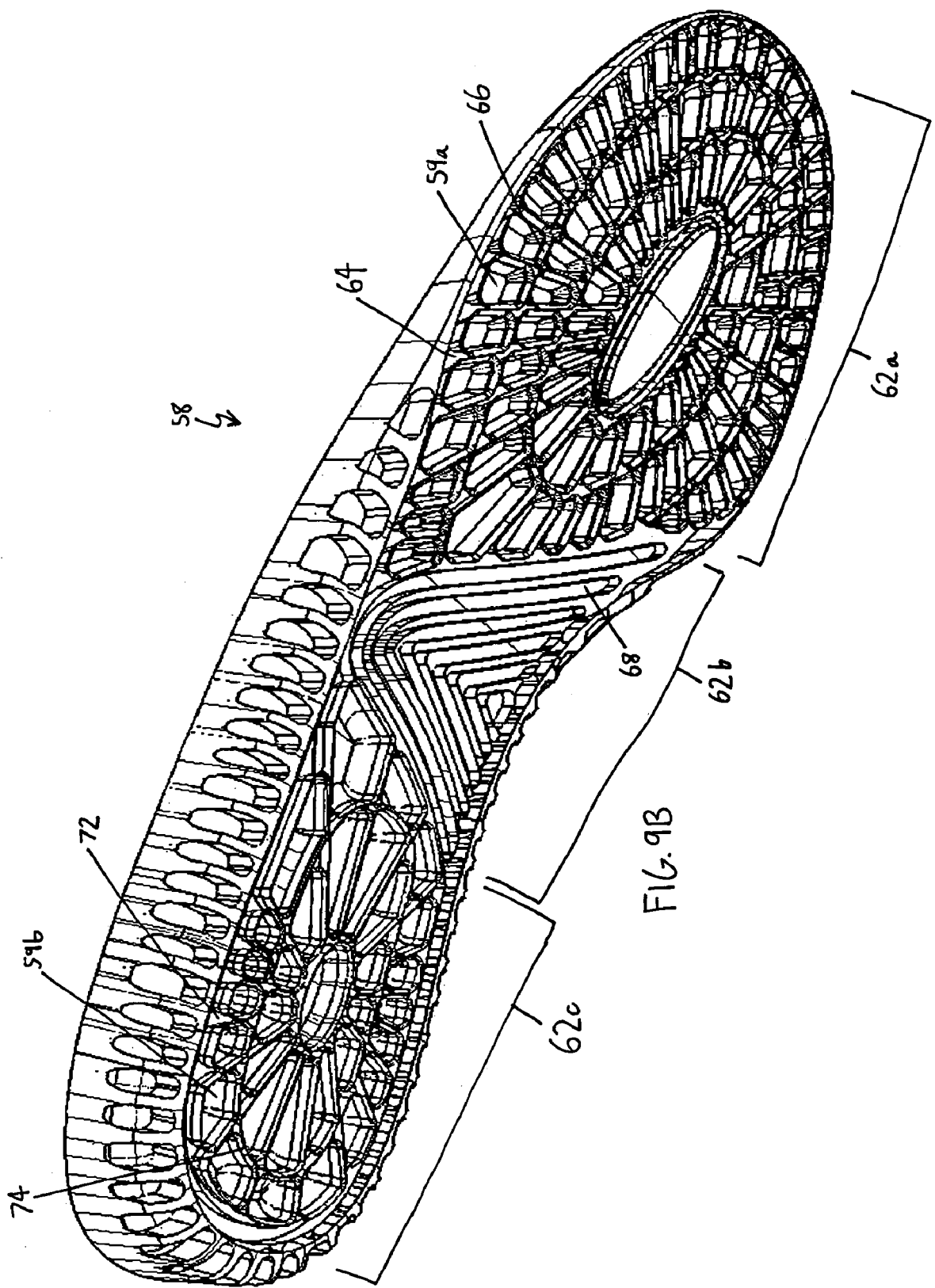

FIGS. 9A and 9B respectively show two different inner sole assemblies that can be manufactured by the preferred method, e.g., the forming surface 6 of FIG. 1 would include the geometries shown in FIGS. 9A and 9B. Each of the inner sole assemblies 56 and 58 are made of a single sheet of material formed by the preferred method and can be made of any natural or synthetic material that is formable by the preferred method. For example, each of inner sole assemblies 56 and 58 can be made of TPU. Alternatively, each of the inner sole assemblies 56 and 58 can be made of two or more material sheets by the preferred method and can also include insert material layers for additional structural support or cushioning, as described above with respect to the preferred method. Further, each of the inner sole assemblies 56 and 58 can be manufactured by any method other than the preferred method that can produce the desired geometries shown in FIGS. 9A and 9B.

Both the inner sole assemblies 56 and 58 are shown from their lower sides, which are configured to contact uppers surfaces of midsoles. Each of the upper sides of the inner sole assemblies 56 and 58 (not shown) is arranged to attach to a textile component that is designed to contact the bottom of a wearer's foot and to absorb shock and perspiration.

The inner sole assembly 56 includes a forefoot portion 60a that includes a plurality of radial recesses 57 forming a plurality of radial channels 64 and a plurality of elliptical channels 66. Each radial recess 57 is recessed away from a wearer of the shoe in which the inner sole assembly 56 is inserted. Each of the radial channels 64 is connected to at least one of the elliptical channels 66 such that the forefoot portion 60a is easily deflected and such that heat generated by a user can be dissipated across the surface of the forefoot portion 60a through the channels. An instep portion 60b of the inner sole assembly 56 includes a plurality of latitudinal channels 68, and a heel portion 60c includes a plurality of semi-circular channels 70 that are positioned along a periphery of the heel portion 60c. The latitudinal channels 68 and the semi-circular channels 70 also provide deflection and heat dissipation.

The inner sole assembly 58 includes a forefoot portion 62a including a plurality of recesses 59a that are configured to form first radial channels 64 (which extend from a periphery of the forefoot portion 62a towards the center of the forefoot portion 62a) and first elliptical channels 66 (which surround the center of the forefoot portion 62a). The inner sole assembly 58 also includes an instep portion 62b including a plurality of latitudinal channels 68. The heel portion 62c includes a plurality of recesses 59b that are configured to form second radial channels 72 and second elliptical channels 74. Unlike the radial recesses 57 of the inner sole assembly 56, recesses 59a and 59b are recessed towards a wearer of the shoe in which the inner sole assembly 58 is inserted.

FIGS. 10A and 10B illustrate a middle sole assembly 76 that can be formed by the preferred method, e.g., the forming surface 6 shown in FIG. 1 would include the geometries shown in FIGS. 10A and 10B. The sole assembly 76 can be made of a thermoplastic (such as TPU), a thermoset, or any other synthetic material that is formable by the preferred method and that exhibits sufficient strength and flexibility associated with the intended use of the finished product.

The sole assembly 76 includes a forefoot portion 78a, an arch portion 78b, and a heel portion 78c, which are shown on a bottom surface 90 and a top surface 92 in FIGS. 10A and 10B, respectively. The sole assembly 76 includes a sidewall 81 that can extend around the periphery of the sole assembly 76 from one side of the forefoot portion 78a to the opposite side, as shown in FIGS. 10A and 10B. The sidewall 81 is shaped to attach to an upper component and can extend farther up an upper component than is shown in the figures. For example, the sidewall 81 can be shaped such that portions of it extend to a lacing portion of the attached upper.

The forefoot portion 78a is correspondingly shaped to the forefoot of a human foot. The forefoot portion 78a includes a toe tab 77 that is configured to attach to an upper footwear structure and to protect the upper footwear structure from wear. The forefoot portion 78a also includes a plurality of axial recesses 82 situated between two rows of peripheral recesses 80. For the purposes of describing FIGS. 10A and 10B, the term "recess" refers to a physical feature of the sole assembly 76 that recesses away from the bottom surface 90 and toward a wearer of the shoe in which the sole assembly 76 is included. That is, each recess of the sole assembly 76 has an opening on the bottom surface 90. Each of the recesses described below is arranged to provide at least one of cushioning, structural support, and deflection of a portion of the sole assembly 76.

Each one of the axial recesses 82 and the peripheral recesses 80 includes a flat support portion 87 including rounded corners. As an alternative to the illustrated example, the support portion 87, and any other support portion described in this disclosure, can include some amount of curvature such that it is at least partially concave or convex with respect to a wearer's foot. The axial recesses 82 are formed along a longitudinal axis of the forefoot portion 78a (i.e., substantially along the x-axis of FIGS. 10A and 10B) and have trapezoidal-shaped bottom portions, while the peripheral recesses 80 are formed near the side edges of the forefoot portion 78a and have triangular-shaped bottom portions. For purposes of structural support, each peripheral recess 80 has a width $W_1$ that decreases from an interior portion of the forefoot portion 78a (i.e., the portion of the forefoot portion 78a including the axial recesses 82) to a width $W_2$ near an outer edge of the forefoot portion 78a.

The arch portion 78b is located between the forefoot portion 78a and the heel portion 78c and is designed to provide support to the arch portion of a human foot. The arch portion 78b includes a plurality of arch recesses 88 that have parallel longitudinal axes arranged along the x-axis of FIGS. 10A and 10B. Each arch recess 88 includes a flat support portion 87 with rounded corners.

The heel portion 78c is designed to provide support to the heel portion of a human foot and includes a plurality of heel recesses 84, each of which includes a flat support portion 87 with rounded corners. Further, each heel recess 84 is triangular-shaped to provide stiffening support.

Each of the peripheral, axial, and heel recesses includes a recess sidewall 83 that connects the flat support portion 87 to the recess opening. Each recess sidewall 83 includes an amount of curvature that can extend from the recess opening to the flat support portion 87 (i.e., the entire length of the recess sidewall is radiussed) or only extends to a particular location on the recess sidewall 83 (e.g., the lines labeled 85 in FIGS. 10A and 10B). In the former case, a compliant deflection curve can be achieved upon the introduction of a load on the flat portion 87 of a recess.

The sole assembly 76 includes side recesses 79, which are formed in the sidewall 81 of the sole assembly. Each of the side recesses 79 includes a flat portion that is configured to support a moderating component. Alternatively, each side recess 79 can be positioned and shaped such that it interfaces with a corresponding protruding area on another footwear structure, such as an upper footwear structure.

The sole assembly 76 is formed by the preferred method to include an insert material layer 86, which can be made of a thermoplastic, a thermoset, or any other material that can be integrally formed with the sole assembly 76 to provide additional stiffening support. The insert material layer 86 is shown separate from the sole assembly 76, but is actually heat-bonded and vacuum-bonded with a portion of the sole assembly 76 during the drawing step of the preferred method, as described above. Also, the insert material layer 86 is shown to correspond to the shape of one of the heel recesses 84, but can alternatively or additionally be formed over any other feature of the sole assembly 76. For instance, a single insert material layer can be adhered to multiple recesses, to any surfaces located between recesses, and/or to additional surfaces surrounding the recesses (e.g., sidewall surfaces). Also, alternatively, the insert material layer 86 can be shaped such that it is bonded to only a portion of a recess (or portions of recesses), e.g., along a recess sidewall 83 and not along a support portion 87.

Moreover, multiple insert material layers can be used at different portions of the sole assembly 76 to provide additional support where desired. When the sole assembly 76 is transparent or translucent, the different insert material layers can be color-coded according to function and location. In this way, a single molding device 4 can be used to create midsoles based on one midsole mold design, but with varying areas of reinforced support.

Further, the sidewalls 81 of the sole assembly 76 can be strengthened by the addition of one or more insert material layers, which can be colored to indicate the location of the increased stiffening. Insert material layers can also be used for purposes of cushioning, in addition to or alternative to stabilizing. The insert material layers can be adhered to only a portion of the sidewalls 81 or to entire surfaces of the sidewalls 81.

FIGS. 10C and 10D illustrate another embodiment of a middle sole assembly that can be formed by the preferred method. The sole assembly 114 includes many general features of the sole assembly 76, and the differences between the two are mostly geometrical in nature. Features of the sole assembly 76 can be combined with the features of the sole assembly 114, and vice versa.

Similarly to the sole assembly 76, the sole assembly 114 includes a forefoot portion 116a, an arch portion 116b, and a heel portion 116c. Like the different portions of the sole assembly 76, each of these portions includes multiple recesses.

The forefoot portion 116a includes a toe recess 119 and plurality of forefoot recesses 118. FIG. 10C illustrates a single toe recess 119 and eighteen forefoot recesses 118, but these quantities can of course be altered to suit various product applications. The toe recess 119 is positioned in the forwardmost region of the forefoot portion 116a and includes a flat support portion 121 shaped to receive the front portion of a moderator or another assembly. Each forefoot recess 118 includes a flat support portion 120 that is circular or semi-circular in periphery and is shaped to receive the forefoot portion of a moderator or other assembly. Also, each forefoot recess 118 also includes a recess opening 122 on the bottom surface 117a of the sole assembly 114, and each recess opening 122 is connected to the corresponding support portion 120 by a recess sidewall 124. The recess openings 122 can be of various shapes, depending on the locations of the associated forefoot recesses 118. For cushioning purposes, each recess sidewall 124 includes an amount of curvature between the recess opening 122 and the support portion 120. The default amount of radii in the curvature can vary depending on application, and the curvature can extend throughout the length of the recess sidewall 124 or only a portion of it.

The forefoot recesses 118 are separated into rows by a number of grooves 126, which extend across the bottom surface 117a from one edge of the forefoot portion 116a to the opposite edge. The grooves 126 are configured to provide added flexibility in the forefoot portion 116a. Although FIG. 10C illustrates the grooves 126 as straight lines, the grooves 126 can alternatively include angular or curved shapes.

The arch portion 116b includes a plurality of arch recesses 128, which are arranged and shaped in a manner similar to the arch recesses 88 of the sole assembly 76.

The heel portion 116c includes a plurality of heel recesses 130, which are shaped and configured similarly to the forefoot recesses 118. The heel portion 116c also includes grooves 132, each of which includes an angular section. Alternatively, grooves 132 can include curved sections or can be substantially straight from one side of the heel portion 116 to an opposite side.

The sole assembly 114 can be formed to include an insert material layer similar to the insert material layer 86 shown in FIG. 10B. As with the sole assembly 76, such a layer can be formed to reinforce not only the various recesses of the sole assembly 114, but any other portions as well.

Figure 11C:
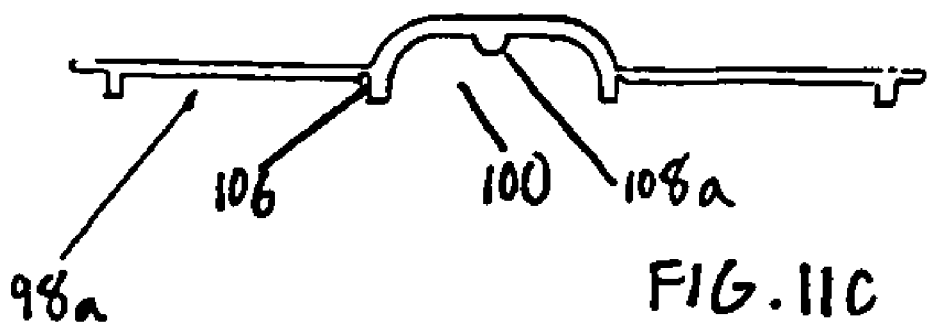
Figure 11D:
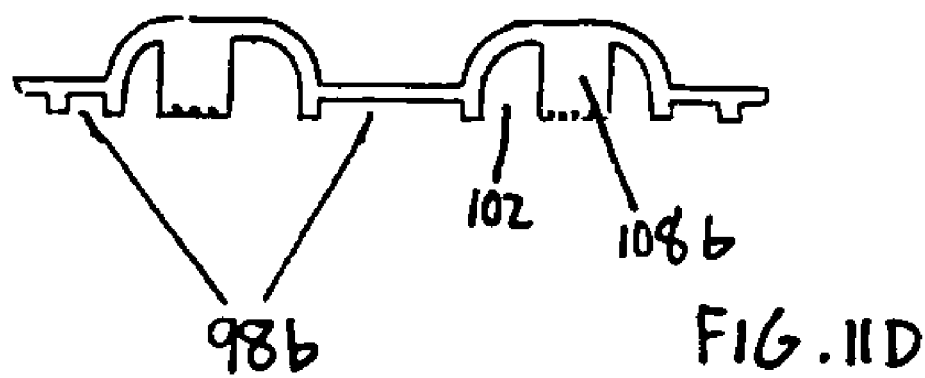

FIGS. 11A–11D illustrate an outsole 94 including a forefoot portion 96a and a heel portion 96b, shown from a bottom surface 112 in FIG. 11A. The forefoot portion 96a and the heel portion 96b are shown as separate components, but the outsole 94 can be alternatively formed such that these portions are a unitary component. The outsole 94 is made of rubber or any other abrasive-resistant material, such as rubber. The outsole 94 can be formed by the preferred method or any other process known in the art. Also, the outsole 94 can include insert material layers combined with any portion of the forefoot portion 96a or the heel portion 96b where additional support is desired, as described above with respect to the sole assembly 76. Moreover, FIGS. 11A–11D show the outsole 94 as including a tread-and-recess pattern, as described below, but can be alternatively formed to include a different traction-providing pattern or be completely flat on the bottom surfaces 112a and 112b.

The forefoot portion 96a includes a plurality of treads 98a on the bottom surface 112a. The treads 98a are arranged as staggered, diagonal protrusions for providing traction to the wearer of the finished shoe unit. A plurality of edge treads 110 are arranged along the periphery of the forefoot portion 96a, also for the purpose of providing traction to a user. Positioned along the longitudinal axis 104 of the forefoot portion 96a are a plurality of axial recesses 100, which are used to align the forefoot portion 96a to a forefoot portion of a midsole and to provide deflection of the forefoot portion 96a. The axial recesses 100 are surrounded by the treads 98a on the bottom surface 112a. Each axial recess 100 has an opening on the bottom surface 112a surrounded by a peripheral groove 106, shown in detail in the cross-sectional view of FIG. 11C. Each peripheral groove 106 provides for deflection of the forefoot portion 96a and for ease of color separation during a coloring process. Also, each axial recess 100 includes a protrusion 108a, which aids in removing mud or dirt during and after usage of the finished shoe unit.

The heel portion 96b includes a plurality of treads 98b on the bottom surface 112b. Like the treads 98a, the treads 98b are arranged as staggered, diagonal protrusions for providing traction to the wearer of the finished shoe unit. A plurality of edge treads 110 are arranged along the periphery of the heel portion 96b, also for the purpose of providing traction to a user. Positioned on the bottom surface 112b are a plurality of heel recesses 102, which are used to align the heel portion 96b to a heel portion of a midsole and to provide deflection of the heel portion 96b. The heel recesses 102 are surrounded by the treads 98b on the bottom surface 112b. Also, each heel recess 102 includes a protrusion 108b, which aids in removing mud or dirt during and after usage of the finished shoe unit.

Figure 12A:
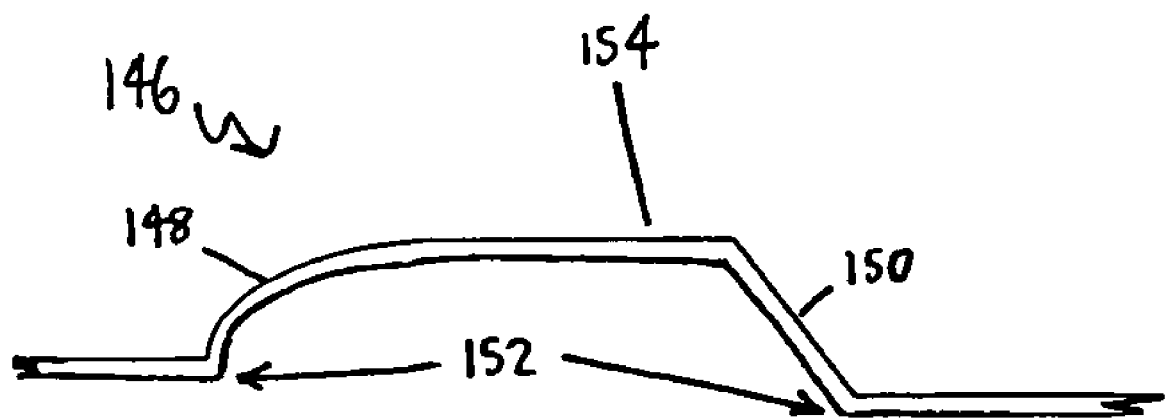
FIGS. 12A and 12B are different views of a cushioning recess in accordance with a further aspect of the present invention.
Figure 12B:
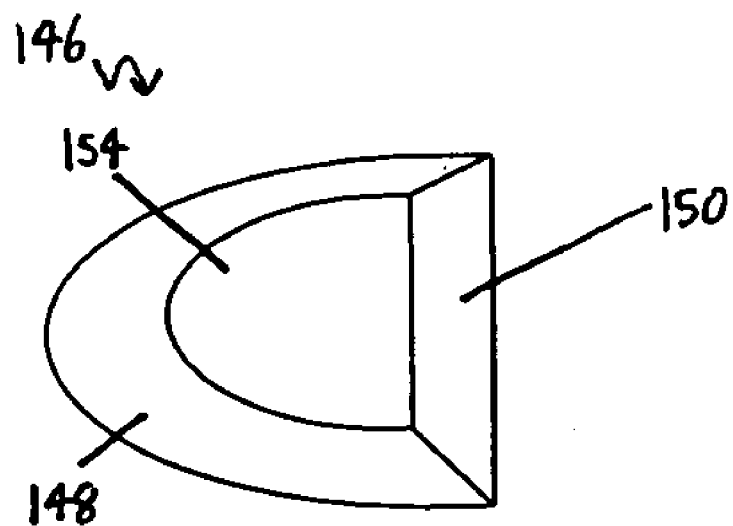

FIGS. 12A and 12B show different views of an alternative cushioning recess 146 that includes a curved sidewall 148 and a chamfered sidewall 150. Unlike the surfaces of other recesses discussed above, the chamfered sidewall 150 is completely planar and does not include any amount of curvature between the recess opening 152 and the flat support surface 154. Alternatively, the recess 146 can include more than one chamfered sidewall in a configuration depending on product application. The cushioning recess 146 can be substituted for any of the recesses discussed above with respect to exemplary embodiments of the present invention.

Figure 13:
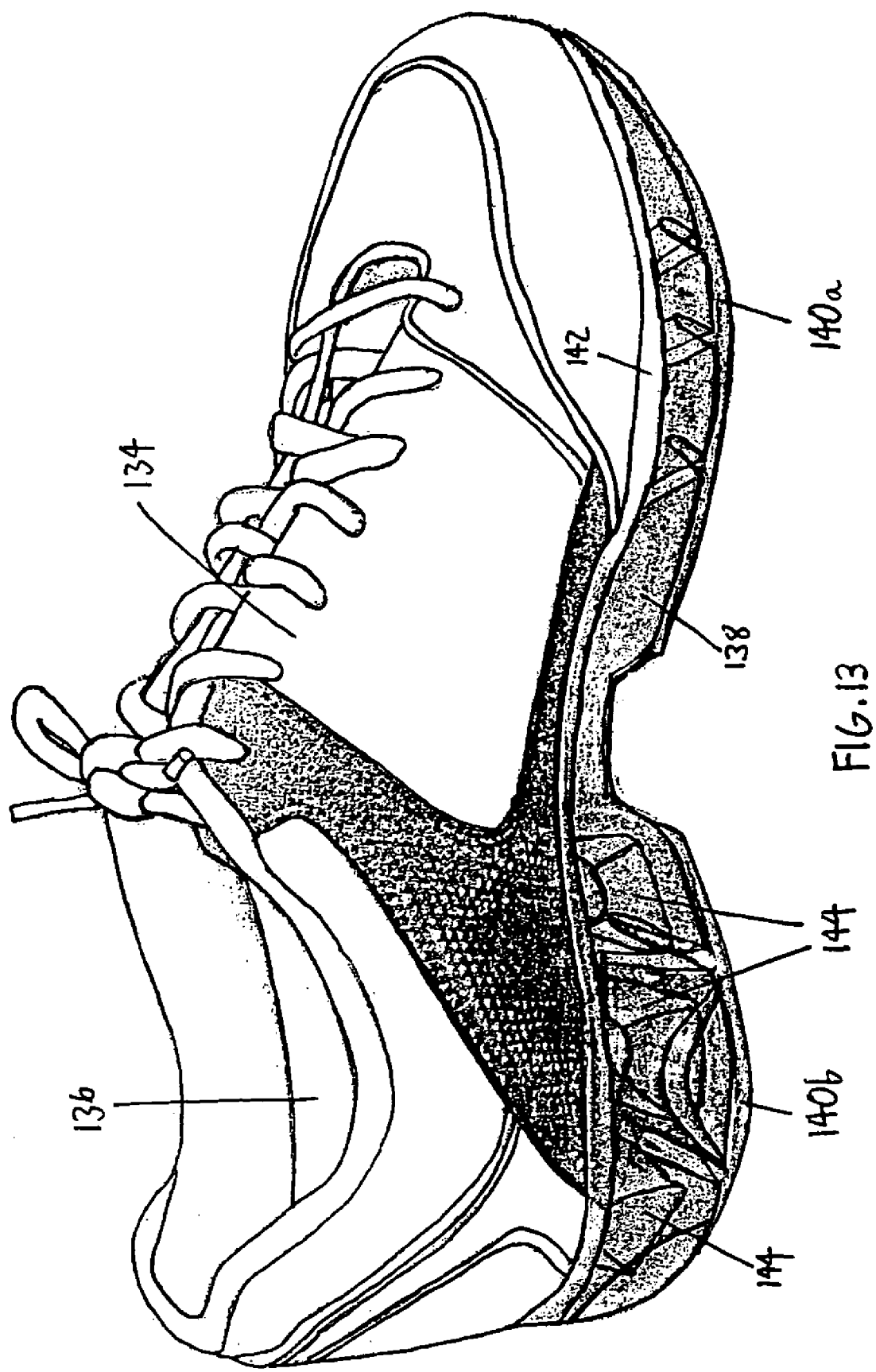
FIG. 13 is a side view of a shoe including footwear structures formed in accordance with aspects of the present invention.

FIG. 13 illustrates a complete shoe assembly 134 that includes footwear structures formed in accordance with the above-described aspects of the present invention. The shoe assembly 134 includes an upper 134, an inner assembly 136, a sole assembly 138, and outer sole structures 140a and 140b. The upper 134 is attached to the sole assembly 138 at an overlap portion 142 by an adhesive material, stitching, or any means known in the art. The sole assembly 138 is attached to the second sole structures 140a and 140b by an adhesive material, riveting, or any other means known in the art. The moderating component 136 is placed within the upper 134 and on a top surface of the sole assembly 138. The inner assembly 136 can be permanently adhered to the sole assembly 138 (e.g., by an adhesive material) or can be a removable component of the shoe assembly 134.

The upper 134 can be formed in the manner described above for creating upper 39 (FIGS. 8A and 8B). Alternatively, the upper 134 can be formed by conventional processes (e.g., twin-sheet molding, stitching, etc.) and out of common footwear materials such as leather and nylon.

The sole assembly 138 can be formed in the manner described above for creating sole assembly 114 (FIGS. 10C and 10D). As shown in FIG. 13, the sole assembly 138 includes insert material layers 144. The sole assembly 138 is translucent or transparent in this embodiment, such that the insert material layers 144 are highly visible if they, or the recesses they reside in, are colored to contrast with the color of the sole assembly 138. This effect can not only be cosmetically appealing, but also useful to a consumer interested in the portions of the shoe assembly 138 that provide additional cushioning and support. With respect to the overlap portion 142, the bottom portion of the upper 134 is visible through the sidewall of the sole assembly 138 creating the overlap when the sidewall is on the exterior side of the overlap portion 142.

The visible surface of the inner assembly 136 is a perspiration-absorbing textile material, the underside of which is attached to a sole structure that can be formed in the manner described above for creating assemblies 56 and 58 (FIGS. 9A and 9B). The outer sole structures 140a and 140b can be formed in the manner described above for creating portions 96a and 96b (FIG. 11A). Further, the outer sole structures 140a and 140b can be adhered to the sole assembly 138 during a forming process, for example, by using a female mold and inserting the outer sole structures 140a and 140b in the mold prior to positioning the material used to create the sole assembly 138 in the mold. Alternatively, the outer sole structures 140a and 140b can be attached to the sole assembly 138 by applying an adhesive material or any other post-forming attaching method known in the art.

It will be appreciated by those skilled in the art that the present invention can be embodied in other specific forms without departing from the spirit or essential characteristics thereof. For example, the various embodiments of the present invention can be applied not only to the manufacture of footwear structures, but of any structures that are used to provide support and/or cushioning, such as product packaging inserts.

Therefore, the presently disclosed embodiments are therefore considered in all respects to be illustrative and not restrictive. The scope of the invention is indicated by the appended claims rather than the foregoing description and all changes that come within the meaning and range and equivalents thereof are intended to be embraced.

What is claimed as new and desired to be secured by Letters Patent of the United States is:

1. A footwear structure comprising:
an upper; and
a sole assembly attached to the upper, the sole assembly including a first material layer made of a thermoplastic, and a second material layer attached to the first material layer, wherein,
the first material layer includes a recessed area including a flat support portion supported by a recess sidewall, wherein the recess sidewall extends upwardly from a top surface,
the first material layer is transparent or translucent,
at least a portion of the second material layer is positioned on at least a portion of the flat support portion and on at least a portion of the recess sidewall of the recessed area, and
a color of the second material layer indicates at least one of a location and a function of the second material layer.

2. The footwear structure of claim 1, wherein the second material layer is heat-bonded and vacuum-bonded to the first material layer via a single-sheet thermoforming process.

3. The footwear structure of claim 1, wherein at least one of the first and second material layers is made of a thermoplastic or a thermoset.

4. The footwear structure of claim 1, wherein at least one of the first and second material layers is made of thermoplastic polyurethane.

5. The footwear structure of claim 1, wherein the recessed area is configured to provide one of cushioning and stability for a user.

6. The footwear structure of claim 1, further comprising:
a moderating component positioned between the sole assembly and the upper, wherein the moderating component is supported by the flat support portion of the recessed area.

7. The footwear structure of claim 1, wherein the sole assembly further includes a third material layer attached to a sidewall portion of the first material layer, the third material layer being configured to provide stability for a user.

8. The footwear structure of claim 7, wherein the third material layer is heat-bonded and vacuum-bonded to the first material layer.

9. The footwear structure of claim 1, wherein the first material layer further includes a plurality of recessed areas each of which extends upwardly from the top surface, wherein each of the recessed areas includes a flat support portion supported by a recess sidewall, wherein the recess sidewall extends upwards from the top surface, and wherein at least a portion of the second material layer is positioned on the flat support portions and recess sidewalls of the plurality of recessed areas, as well as on the top surface connecting the various recessed areas.

10. A footwear structure comprising:
an upper; and
a sole assembly attached to the upper, the sole assembly including a first material layer made of a thermoplastic, and a second material layer heat-bonded and vacuum-bonded to the first material layer, wherein,
the first material layer includes a recessed area being configured to provide one of cushioning and stability for a user, wherein the recessed area comprises a recess sidewall extending from a top surface and supporting a flat support portion, and at least a portion of the second material layer is positioned on at least a portion of the flat support portion and on at least a portion of the recess sidewall of the recessed area.

11. The footwear structure of claim 10, wherein the recessed area includes a flat support portion.

12. The footwear structure of claim 11, wherein the flat support portion is substantially shaped as one of a trapezoid, circle, and triangle.

13. The footwear structure of claim 11, wherein the flat support portion includes rounded corners.

14. The footwear stricture of claim 10, wherein the sole assembly includes a third material layer heat-bonded and vacuum-bonded to the first material layer, wherein the third material layer is positioned on a sidewall portion of the first material layer.

15. The footwear structure of claim 10, wherein the first material layer further includes a plurality of recessed areas each of which extends upwardly from the top surface, wherein each of the recessed areas includes a flat support portion supported by a recess sidewall, wherein the recess sidewall extends upwards from the top surface, and wherein at least a portion of the second material layer is positioned on the flat support portions and recess sidewalls of the plurality of recessed areas, as well as on the top surface connecting the various recessed areas.

16. The footwear structure of claim 10, wherein the second material layer and the first material layer are bonded to each other via a single-sheet thermoforming process.

17. A sole assembly, comprising:
a first material layer made of a thermoplastic, wherein,
the first material layer includes a recessed area fanned from the first material layer, and
the recessed area includes a flat support portion, a recess opening on a first surface of the first material layer, and a recess sidewall connecting the flat support portion to the recess opening; and
a second material layer, wherein at least a portion of the second material layer is positioned on at least a portion of the recess sidewall and on at least a portion of the flat support portion.

18. The sole assembly of claim 17, wherein the recessed area is positioned in a sidewall portion of the sole assembly.

19. The sole assembly of claim 17, wherein the flat support portion is substantially shaped as one of a trapezoid, circle, and triangle.

20. The sole assembly of claim 17, wherein the flat support portion includes rounded corners.

21. The sole assembly of claim 17, wherein the recess sidewall includes an amount of curvature that extends from the recess opening to the flat support portion.

22. The sole assembly of claim 21, further comprising:
a second recess sidewall that is planar from the recess opening to the flat support portion.

23. The sole assembly of claim 17, wherein the recess sidewall includes an amount of curvature that extends from the recess opening to a location on the recess sidewall.

24. The sole assembly of claim 17, wherein the flat support portion is configured to support a moderating component.

25. The sole assembly of claim 17, wherein the recess opening is configured to interface with a protruding area of another footwear structure.

26. The sole assembly of claim 17, wherein the first material layer is transparent or translucent.

27. The sole assembly of claim 17, wherein the first material layer includes a toe tab portion configured to attach to and to prevent damage to an upper footwear structure.

28. The sole assembly of claim 17, wherein
the second material layer is heat-bonded and vacuum-bonded to the first material layer via a single-sheet thermoforming process.

29. The sole assembly of claim 28, wherein at least a portion of the second material layer is positioned on a sidewall portion of the sole assembly.

30. The sole assembly of claim 28, wherein the second material layer is made of a thermoplastic.

31. The sole assembly of claim 28, wherein the second material layer is colored to indicate at least one of location and function of the second material layer.

32. The sole assembly of claim 17, including a forefoot area and a heel area.

33. The sole assembly of claim 32, wherein,
the forefoot area includes a plurality of axial recesses arranged along a longitudinal axis of the forefoot area, and
the heel area includes a plurality of heel recesses, wherein the recessed area is one of the peripheral, axial, and heel recesses.

34. The sole assembly of claim 33, wherein the forefoot area includes a plurality of peripheral recesses, and the axial recesses are positioned between two areas of peripheral recesses.

35. The sole assembly of claim 34, wherein,
each peripheral recess includes a recess opening on a first surface of the first material layer, and
a width of each peripheral recess measured on the first surface decreases from an interior portion of the first surface to an edge of the first surface.

36. The sole assembly of claim 17, wherein,
the forefoot portion includes a first tread area, and
the heel portion includes a second tread area.

37. The sole assembly of claim 17, wherein the axial recesses are surrounded by the first tread area.

38. The sole assembly of claim 17, wherein
the recess opening is adjacently surrounded by a peripheral groove.

39. The sole assembly of claim 17, wherein,
the recessed area includes a protrusion extending from the flat support portion toward the recess opening, and
the protrusion is configured to allow for removal of ground matter accumulated in the recessed area during usage of the sole assembly.

40. The sole assembly of claim 17, further comprising:
a forefoot area having a plurality of radial channels and a plurality of elliptical
channels, wherein each of the radial channels is connected to at least one of the elliptical channels to provide deflection of the forefoot area and to allow heat dissipation across the forefoot area; and
an instep portion having a plurality of latitudinal channels arranged to provide deflection of the instep portion and to allow air flow across the instep portion.

41. The sole assembly of claim 40, further comprising:
a heel area having a second plurality of radial channels and a second plurality of elliptical channels, wherein each of the second radial channels is connected to at least one of the second elliptical channels to provide deflection of the heel area and to allow heat dissipation across the heel area.

42. The sole assembly of claim 40, further comprising:

a heel area having a plurality of semi-circular channels positioned along a periphery of the heel area, wherein the semi-circular channels are arranged to provide deflection of the heel area and to allow heat dissipation across the heel area.

43. The sole assembly of claim 17, further comprising:

a groove extending from a first edge of the first material layer to a second edge of the first material layer.

44. The sole assembly of claim 17, wherein the recess sidewall is planar from the recess opening to the flat support portion.

45. The sole assembly of claim 17, wherein the first material layer further includes a plurality of recessed areas each of which extends upwardly from the top surface, wherein each of the recessed areas includes a flat support portion supported by a recess sidewall, wherein the recess sidewall extends upwards from the top surface, and wherein at least a portion of the second material layer is positioned on the flat support portions and recess sidewalls of the plurality of recessed areas, as well as on the top surface connecting the various recessed areas.

46. A sole assembly, comprising:

a first material layer made of a thermoplastic, wherein, the first material layer includes a plurality of recesses formed from the first material layer, and the recesses forming the plurality of recesses each includes a flat support portion, a recess opening on a first surface of the first material layer, and a recess sidewall connecting the flat support portion to the recess opening; and a second material layer, wherein at least a portion of the second material layer is positioned in at least a portion of two or more of the recesses; and further wherein:

the sole assembly further comprises a forefoot portion, an arch portion, and a heel portion, and wherein the plurality of recesses includes a recess located in each of the forefoot portion, the arch portion, and the heel portion, and further wherein, at least a portion of the second material layer is positioned on a surface of two or more recesses, wherein at least two of the recesses are located on different portions of the sole assembly.

* * * * *